United States Patent
Ji et al.

(10) Patent No.: US 12,382,388 B2
(45) Date of Patent: Aug. 5, 2025

(54) DISCONTINUOUS RECEPTION FOR CONFIGURED GRANT/SEMI-PERSISTENT SCHEDULING

(71) Applicant: QUALCOMM Incorporated, San Diego, CA (US)

(72) Inventors: Lianghai Ji, San Diego, CA (US); Jun Ma, San Diego, CA (US); Liangping Ma, San Diego, CA (US); Huilin Xu, Temecula, CA (US); Mohamad Sayed Hassan, Paris (FR); Qiang Wu, San Diego, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/724,373

(22) Filed: Apr. 19, 2022

(65) Prior Publication Data

US 2023/0337132 A1    Oct. 19, 2023

(51) Int. Cl.
*H04W 52/02* (2009.01)
*H04W 72/23* (2023.01)

(52) U.S. Cl.
CPC ... *H04W 52/0216* (2013.01); *H04W 52/0229* (2013.01); *H04W 72/23* (2023.01)

(58) Field of Classification Search
CPC .................................... H04W 52/0216
See application file for complete search history.

(56) References Cited

U.S. PATENT DOCUMENTS

| 2022/0247520 A1* | 8/2022 | Zhang | H04L 1/1812 |
| 2023/0131118 A1* | 4/2023 | Kim | H04W 52/0216 370/311 |

* cited by examiner

*Primary Examiner* — Jason E Mattis
*Assistant Examiner* — Latha Chakravarthy
(74) *Attorney, Agent, or Firm* — Holland & Hart LLP

(57) ABSTRACT

Methods, systems, and devices for wireless communication are described. A user equipment (UE) may identify a time period during which the UE is configured to receive grants scheduling communications for the UE, wherein the grants are associated with a first grant format type. The UE may determine that the grants include a feedback process identifier exceeding a threshold value. The UE may maintain a power saving state of a discontinuous reception procedure for a feedback process associated with the feedback process identifier during the time period based at least in part on the feedback process identifier exceeding the threshold value.

20 Claims, 13 Drawing Sheets

DISCONTINUOUS RECEPTION FOR CONFIGURED GRANT/SEMI-PERSISTENT SCHEDULING

FIELD OF TECHNOLOGY

The following relates to wireless communication, including discontinuous reception for configured grant/semi-persistent scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support discontinuous reception (DRX) for configured grant (CG)/semi-persistent scheduling (SPS). For example, the described techniques provide various mechanisms where a user equipment (UE) can conserve power by maintaining a power saving state during a time period when the UE is configured to receive grants. For example, the UE may identify or otherwise determine the time period during which the UE is configured to receive grant(s) having a first grant format type (e.g., downlink control information (DCI) grants using a fallback DCI formats 0-0/1-0). The UE may use the configuration information for the communications (e.g., CG configuration and/or SPS configuration) to identify or otherwise determine that the grants include a feedback process identifier exceeding a threshold (e.g., hybrid automatic repeat/request (HARQ) process identifier (ID)). Accordingly, the UE may maintain a disconnected state of a DRX procedure during the time period. For example, this may include the UE not monitoring for such grants, disabling timer(s) associated with the grants (e.g., retransmission timer and/or feedback timers), and the like. Accordingly, the UE may avoid monitoring for such grants during the time period when those grants include HARQ process ID number/values exceeding the threshold value.

A method for wireless communication at a UE is described. The method may include identifying a time period during which the UE is configured to receive grants scheduling communications for the UE, where the grants are associated with a first grant format type, determining that the grants include a feedback process identifier exceeding a threshold value, and maintaining a power saving state of a DRX procedure for a feedback process associated with the feedback process identifier during the time period based on the feedback process identifier exceeding the threshold value.

An apparatus for wireless communication at a UE is described. The apparatus may include a processor, memory coupled with the processor, and instructions stored in the memory. The instructions may be executable by the processor to cause the apparatus to identify a time period during which the UE is configured to receive grants scheduling communications for the UE, where the grants are associated with a first grant format type, determine that the grants include a feedback process identifier exceeding a threshold value, and maintain a power saving state of a DRX procedure for a feedback process associated with the feedback process identifier during the time period based on the feedback process identifier exceeding the threshold value.

Another apparatus for wireless communication at a UE is described. The apparatus may include means for identifying a time period during which the UE is configured to receive grants scheduling communications for the UE, where the grants are associated with a first grant format type, means for determining that the grants include a feedback process identifier exceeding a threshold value, and means for maintaining a power saving state of a DRX procedure for a feedback process associated with the feedback process identifier during the time period based on the feedback process identifier exceeding the threshold value.

A non-transitory computer-readable medium storing code for wireless communication at a UE is described. The code may include instructions executable by a processor to identify a time period during which the UE is configured to receive grants scheduling communications for the UE, where the grants are associated with a first grant format type, determine that the grants include a feedback process identifier exceeding a threshold value, and maintain a power saving state of a DRX procedure for a feedback process associated with the feedback process identifier during the time period based on the feedback process identifier exceeding the threshold value.

In some examples of the method, apparatuses, and non-transitory computer-readable medium described herein, identifying the time period may include operations, features, means, or instructions for receiving a reconfiguration message reconfiguring communication parameters of the UE, where the time period may be based on a timing of the reconfiguration message.

In some examples of the method, apparatuses, and non-transitory computer-readable medium described herein, identifying the time period may include operations, features, means, or instructions for determining that a threshold number of grants may have been received having the first grant format type, where the time period may be based on a timing associated with receiving the threshold number of grants having the first grant format type.

In some examples of the method, apparatuses, and non-transitory computer-readable medium described herein, identifying the time period may include operations, features, means, or instructions for receiving an indication that the UE will maintain the power saving state during the time period, where the time period may be based on the indication.

In some examples of the method, apparatuses, and non-transitory computer-readable medium described herein, the indication may be received in at least one of radio resource control (RRC) signaling, medium access control-control element (MAC-CE) signaling, DCI signaling, or any combination thereof.

In some examples of the method, apparatuses, and non-transitory computer-readable medium described herein, maintaining the power saving state may include operations, features, means, or instructions for refraining from monitoring for at least a subset of the grants scheduling communications during the time period.

In some examples of the method, apparatuses, and non-transitory computer-readable medium described herein, at least the subset of the grants schedule one or more retransmissions of the communications.

In some examples of the method, apparatuses, and non-transitory computer-readable medium described herein, maintaining the power saving state may include operations, features, means, or instructions for disabling or modifying a retransmission timer associated with the feedback process, a feedback round-trip timer associated with the feedback process, or both, during the time period.

Some examples of the method, apparatuses, and non-transitory computer-readable medium described herein may further include operations, features, means, or instructions for identifying a second time period during which the UE may be configured to receive additional grants scheduling communications for the UE, where the additional grants may be associated with a second grant format type and switching to an active state of the DRX procedure during the second time period to receive the additional grants for the feedback process.

In some examples of the method, apparatuses, and non-transitory computer-readable medium described herein, identifying the second time period may include operations, features, means, or instructions for determining that a threshold number of grants may have been received having the second grant format type, where the second time period may be based on a timing associated with receiving the threshold number of grants having the second grant format type.

In some examples of the method, apparatuses, and non-transitory computer-readable medium described herein, identifying the second time period may include operations, features, means, or instructions for receiving an indication that the UE will receive grants associated with the second grant format type, where the second time period may be based on the indication.

Some examples of the method, apparatuses, and non-transitory computer-readable medium described herein may further include operations, features, means, or instructions for switching to an active state of the DRX procedure after expiration of the time period.

In some examples of the method, apparatuses, and non-transitory computer-readable medium described herein, the feedback process identifier may be associated with at least one of CG-based communications or SPS communications.

A method for wireless communication at a network entity is described. The method may include determining a time period during which grants scheduling communications for a UE include a feedback process identifier associated with a feedback process exceeding a threshold value, where the determining is based on the grants being associated with a first grant format type, outputting an indication that the UE will maintain a power saving state of a DRX procedure during the time period for the feedback process based on the feedback process identifier exceeding the threshold value, and refraining from outputting the grants for the feedback process during the time period based on the feedback process identifier exceeding the threshold value.

An apparatus for wireless communication at a network entity is described. The apparatus may include a processor, memory coupled with the processor, and instructions stored in the memory. The instructions may be executable by the processor to cause the apparatus to determine a time period during which grants scheduling communications for a UE include a feedback process identifier associated with a feedback process exceeding a threshold value, where the determining is based on the grants being associated with a first grant format type, output an indication that the UE will maintain a power saving state of a DRX procedure during the time period for the feedback process based on the feedback process identifier exceeding the threshold value, and refrain from outputting the grants for the feedback process during the time period based on the feedback process identifier exceeding the threshold value.

Another apparatus for wireless communication at a network entity is described. The apparatus may include means for determining a time period during which grants scheduling communications for a UE include a feedback process identifier associated with a feedback process exceeding a threshold value, where the determining is based on the grants being associated with a first grant format type, means for outputting an indication that the UE will maintain a power saving state of a DRX procedure during the time period for the feedback process based on the feedback process identifier exceeding the threshold value, and means for refraining from outputting the grants for the feedback process during the time period based on the feedback process identifier exceeding the threshold value.

A non-transitory computer-readable medium storing code for wireless communication at a network entity is described. The code may include instructions executable by a processor to determine a time period during which grants scheduling communications for a UE include a feedback process identifier associated with a feedback process exceeding a threshold value, where the determining is based on the grants being associated with a first grant format type, output an indication that the UE will maintain a power saving state of a DRX procedure during the time period for the feedback process based on the feedback process identifier exceeding the threshold value, and refrain from outputting the grants for the feedback process during the time period based on the feedback process identifier exceeding the threshold value.

Some examples of the method, apparatuses, and non-transitory computer-readable medium described herein may further include operations, features, means, or instructions for outputting information identifying the time period for the UE.

In some examples of the method, apparatuses, and non-transitory computer-readable medium described herein, the information identifying the time period may be output in conjunction with the indication that the UE will maintain the power saving state or may be output in a separate message.

In some examples of the method, apparatuses, and non-transitory computer-readable medium described herein, the information identifying the time period may be output in at least one of RRC signaling, MAC-CE signaling, DCI signaling, or any combination thereof.

In some examples of the method, apparatuses, and non-transitory computer-readable medium described herein, the feedback process identifier may be associated with at least one of CG-based communications or SPS communications.

In some examples of the method, apparatuses, and non-transitory computer-readable medium described herein, at least a subset of the grants schedule one or more retransmissions of the communications.

for configured grant (CG)/semi-persistent scheduling (SPS) in accordance with one or more aspects of the present disclosure.

Figure 2:
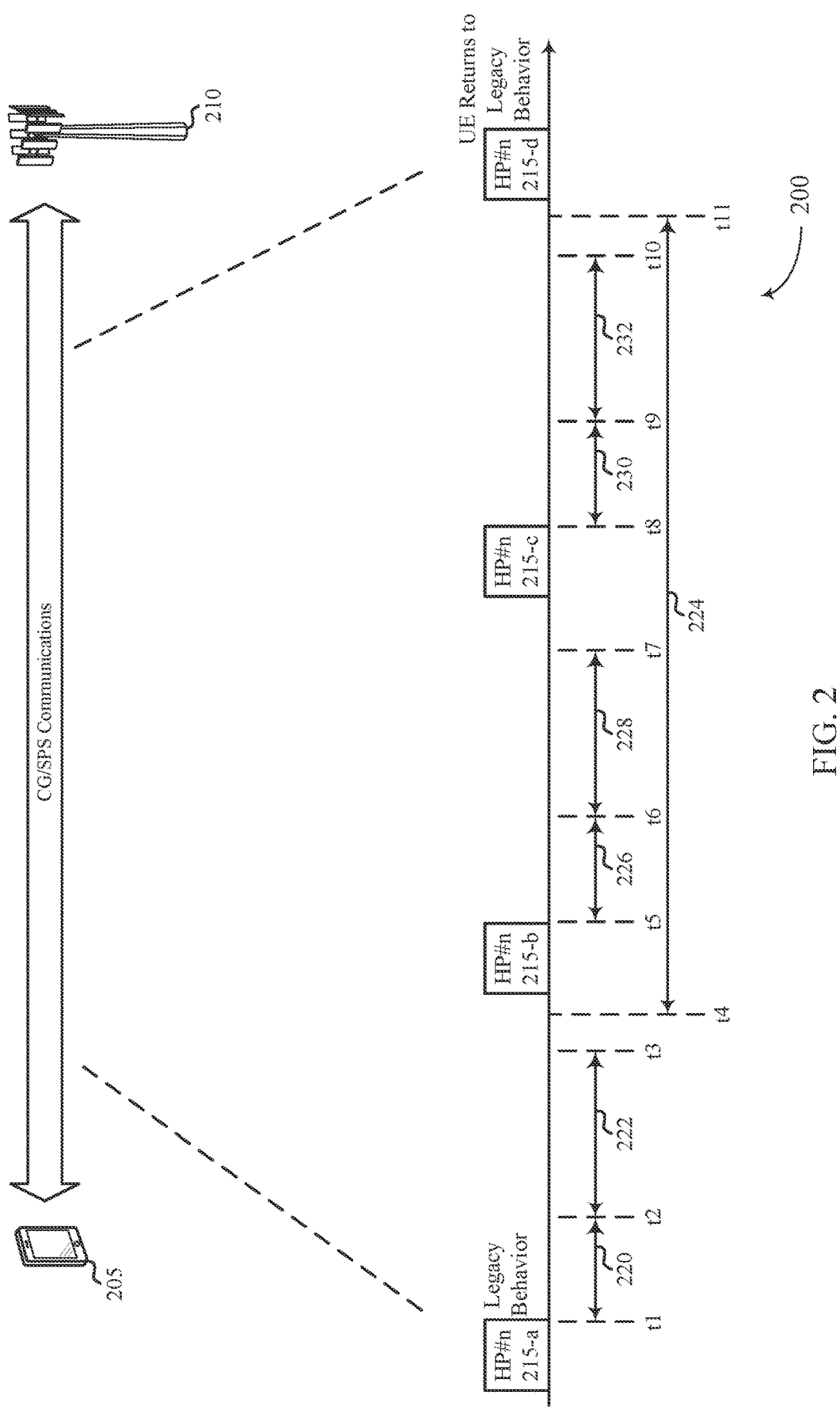

FIG. 2 illustrates an example of a wireless communication system that supports DRX for CG/SPS in accordance with one or more aspects of the present disclosure.

Figure 3:
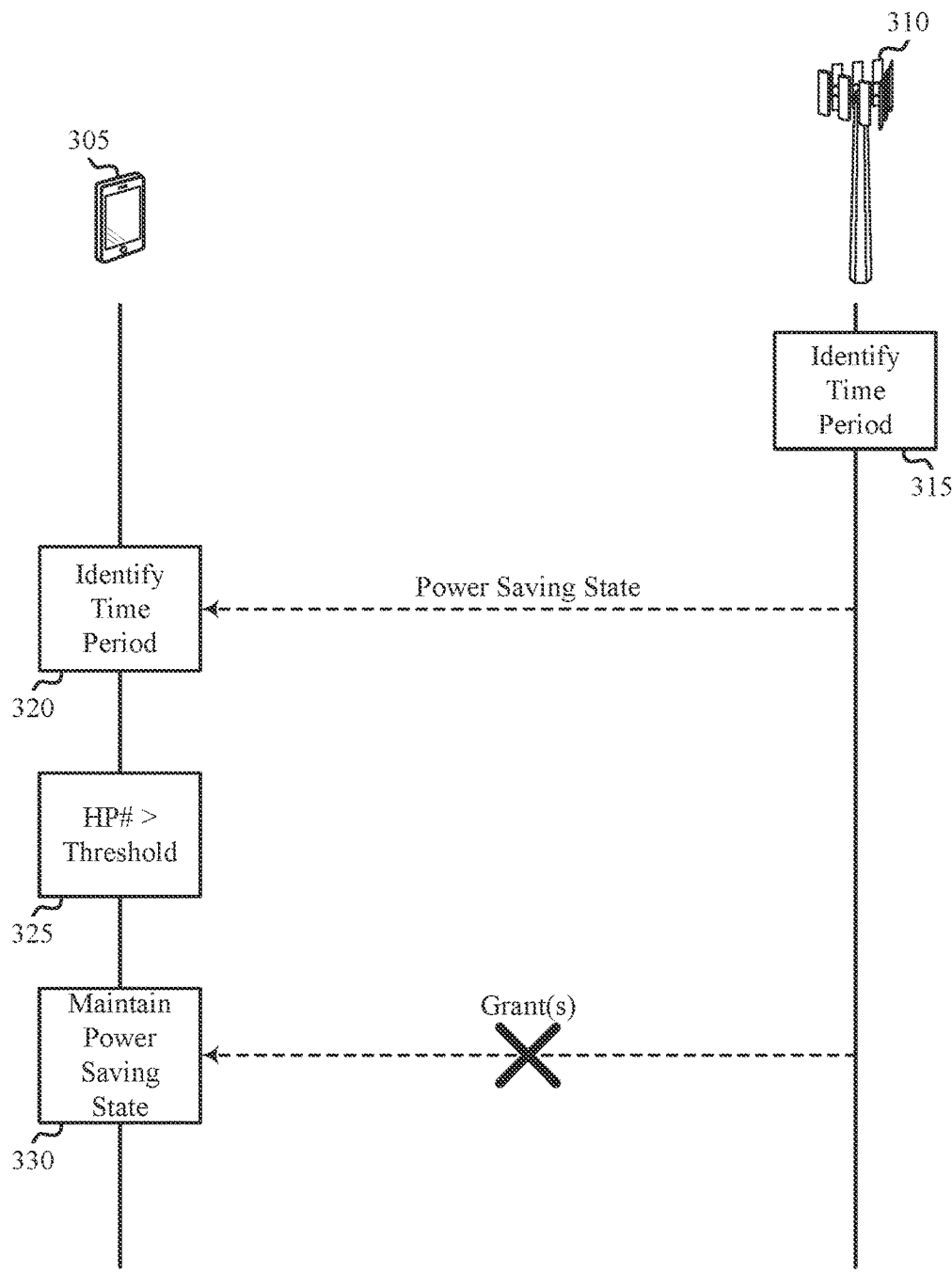

FIG. 3 illustrates an example of a method that supports DRX for CG/SPS in accordance with one or more aspects of the present disclosure.

Figure 4:
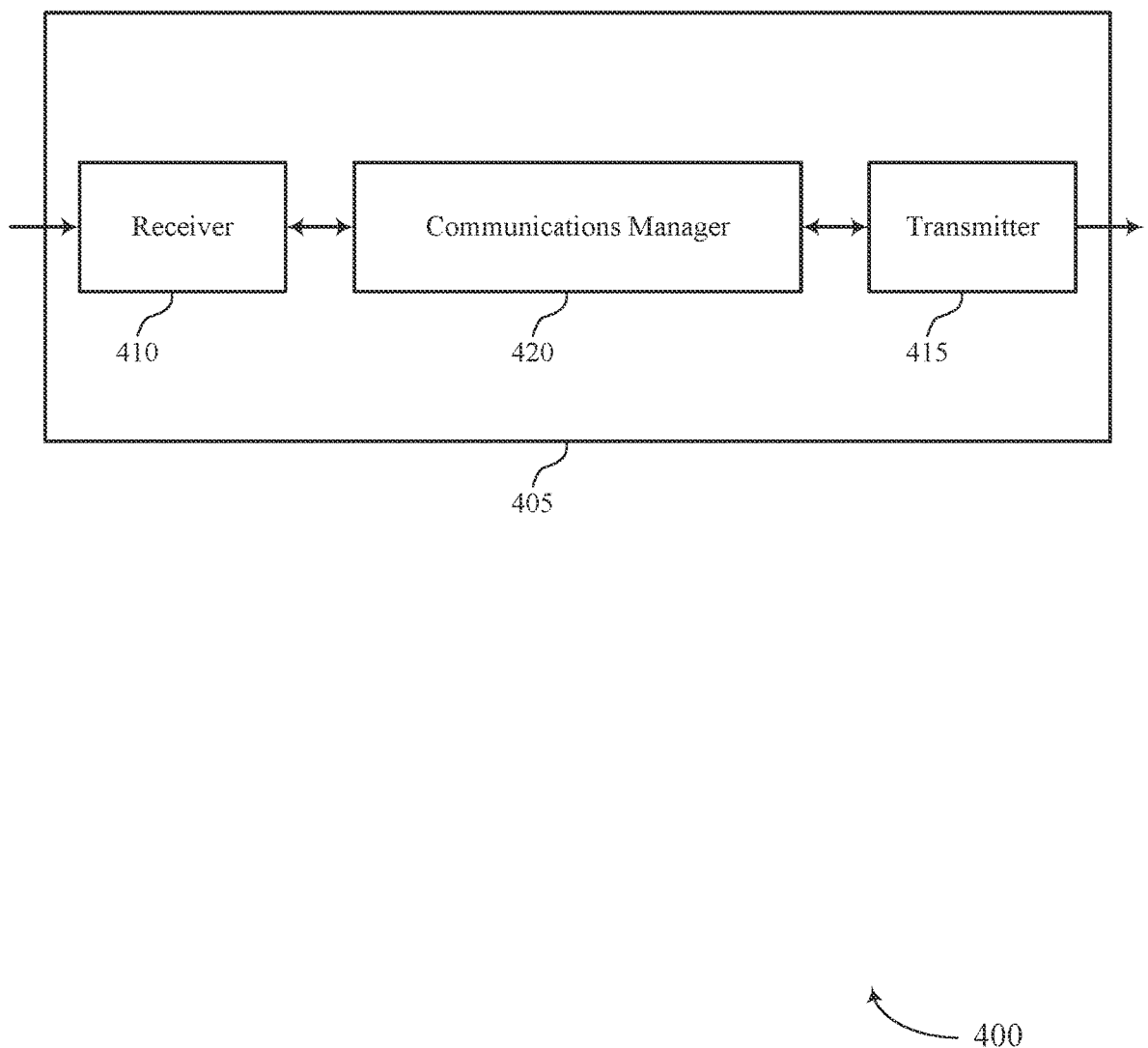
Figure 5:
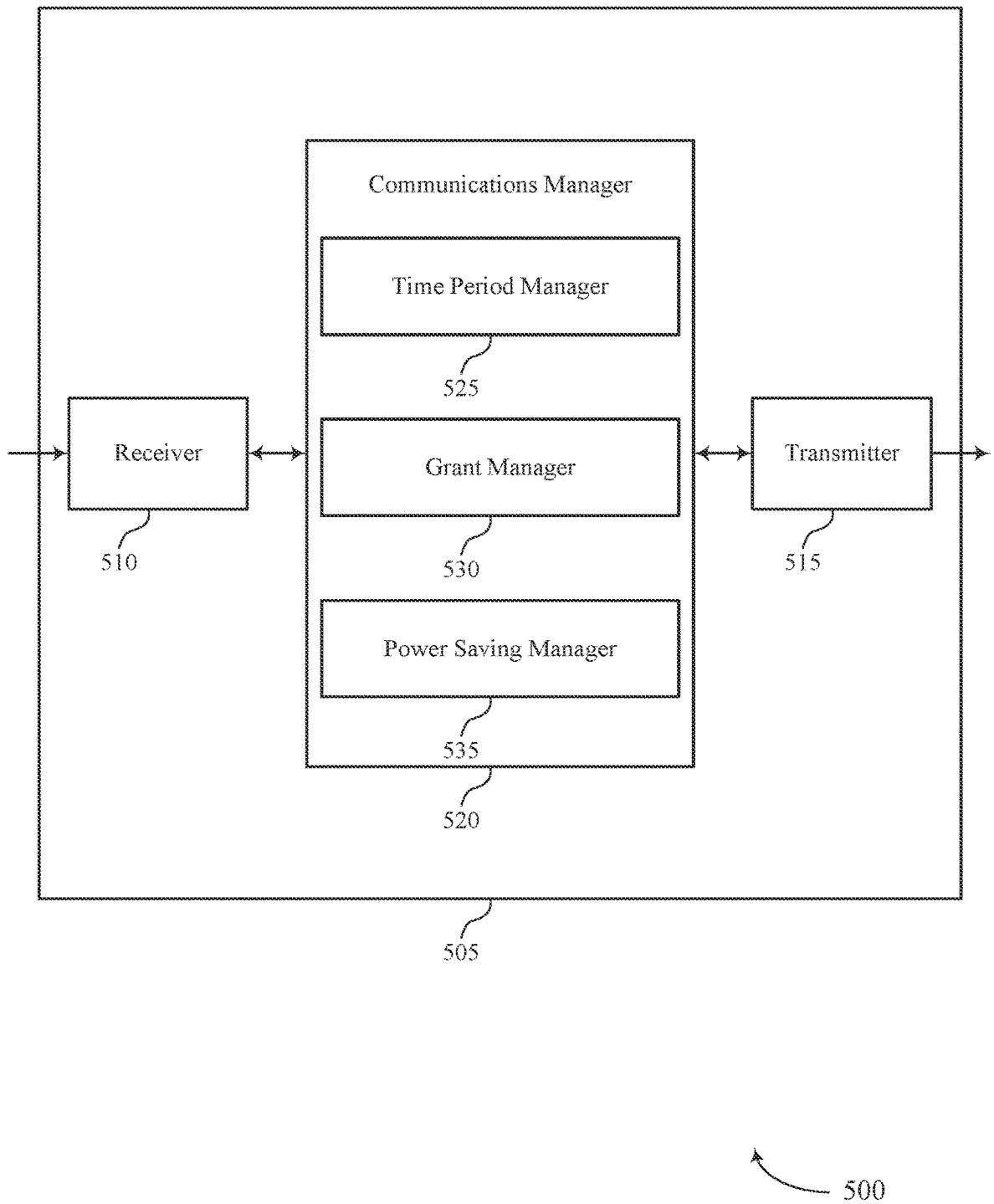

FIGS. 4 and 5 show block diagrams of devices that support DRX for CG/SPS in accordance with one or more aspects of the present disclosure.

Figure 6:
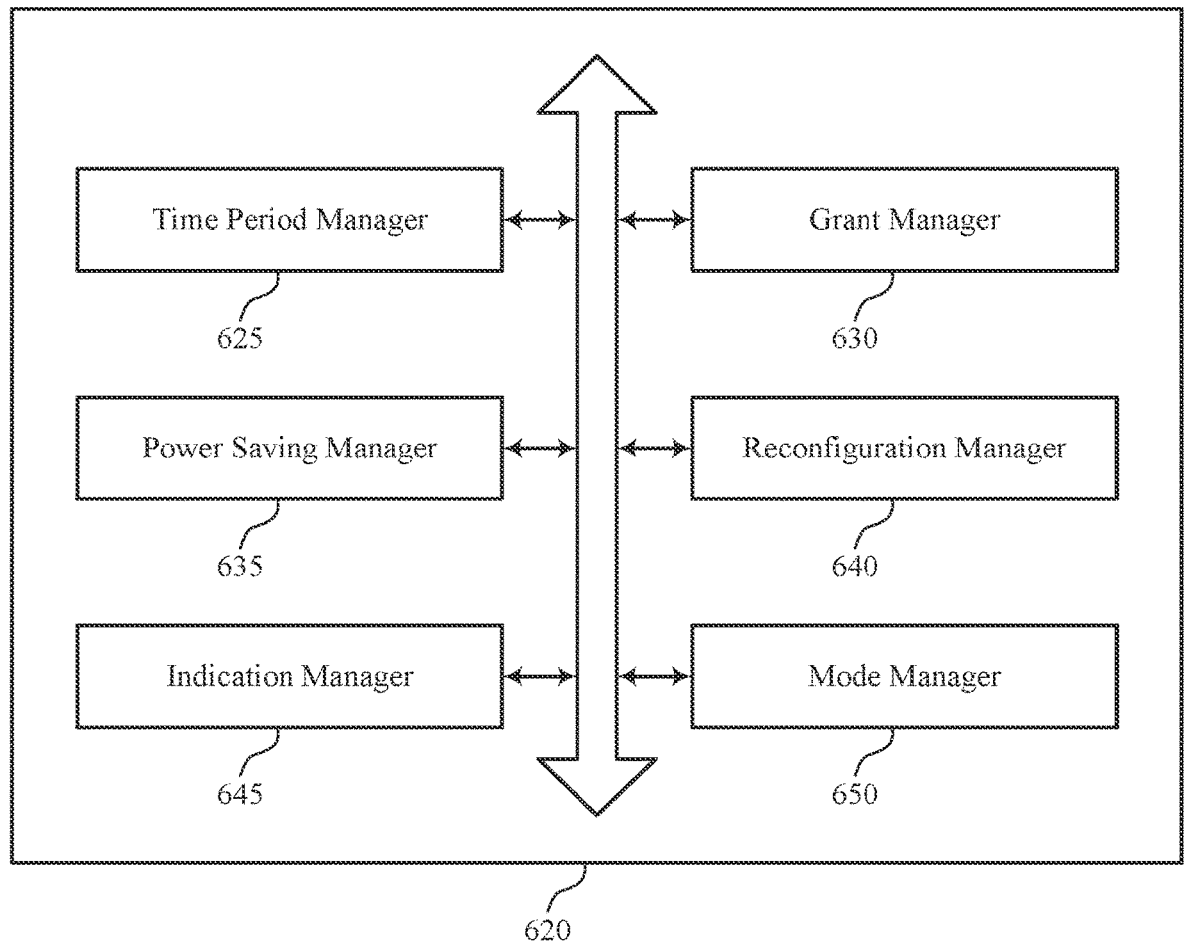

FIG. 6 shows a block diagram of a communications manager that supports DRX for CG/SPS in accordance with one or more aspects of the present disclosure.

Figure 7:
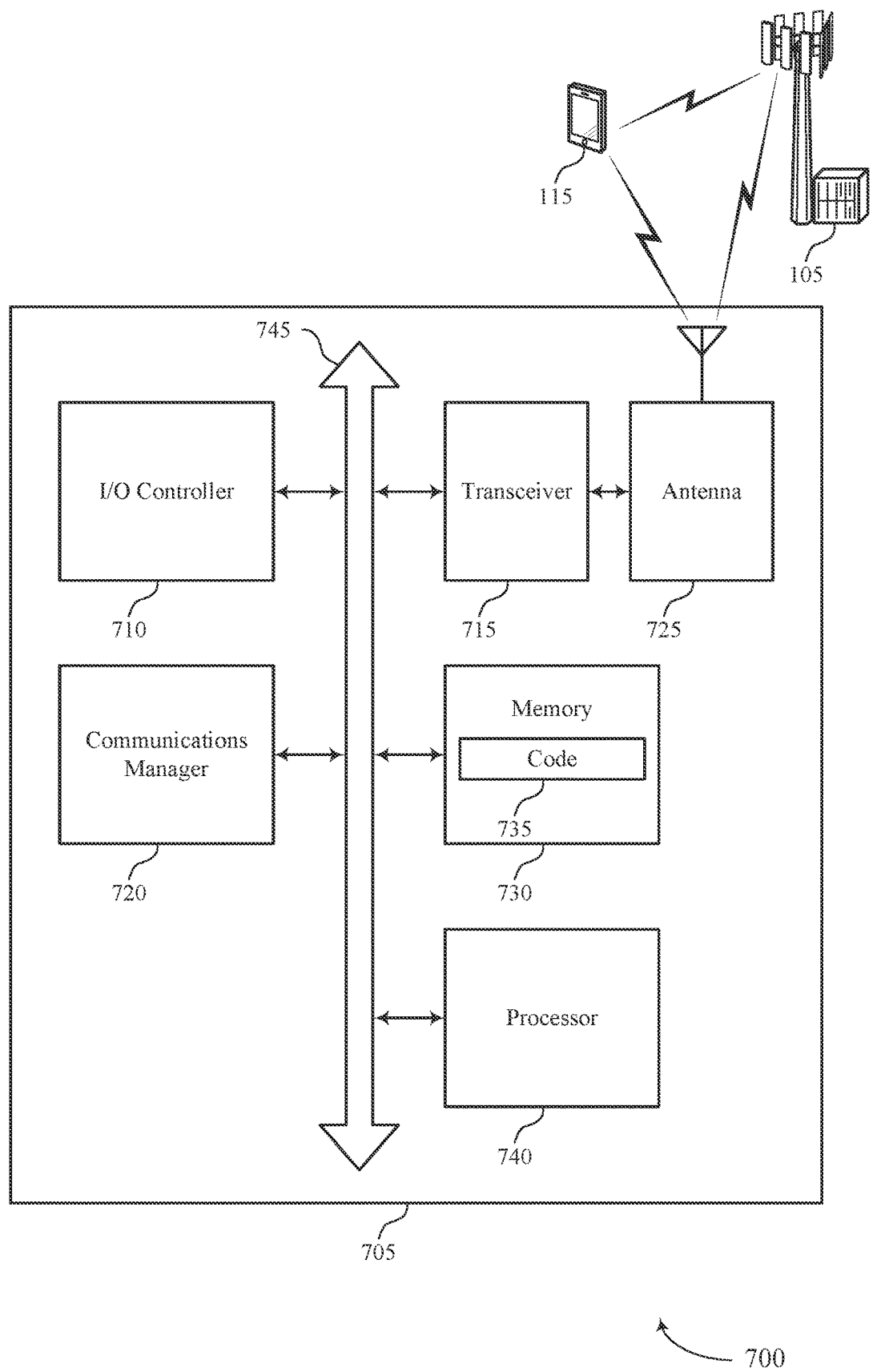

FIG. 7 shows a diagram of a system including a device that supports DRX for CG/SPS in accordance with one or more aspects of the present disclosure.

Figure 8:
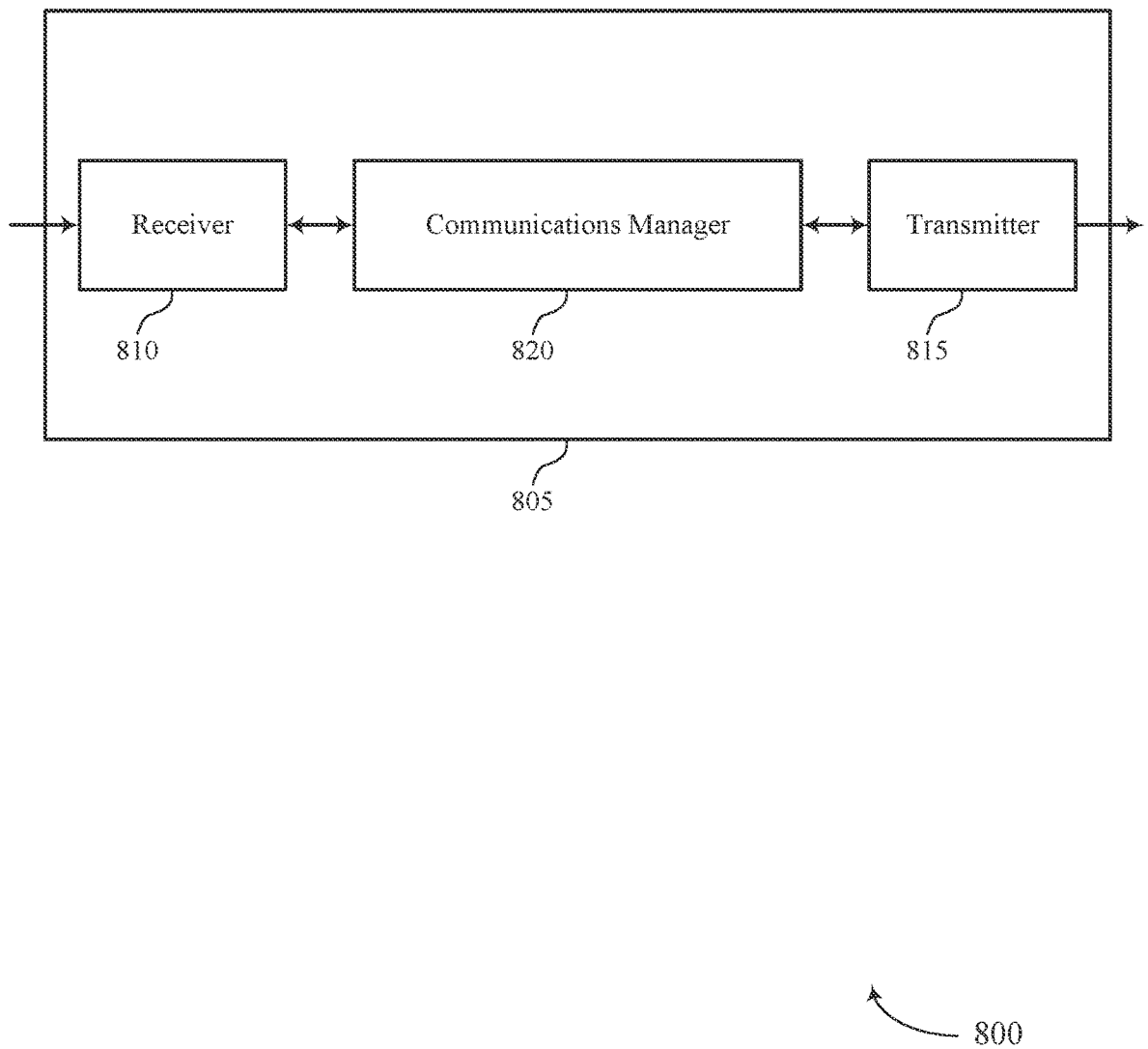
Figure 9:
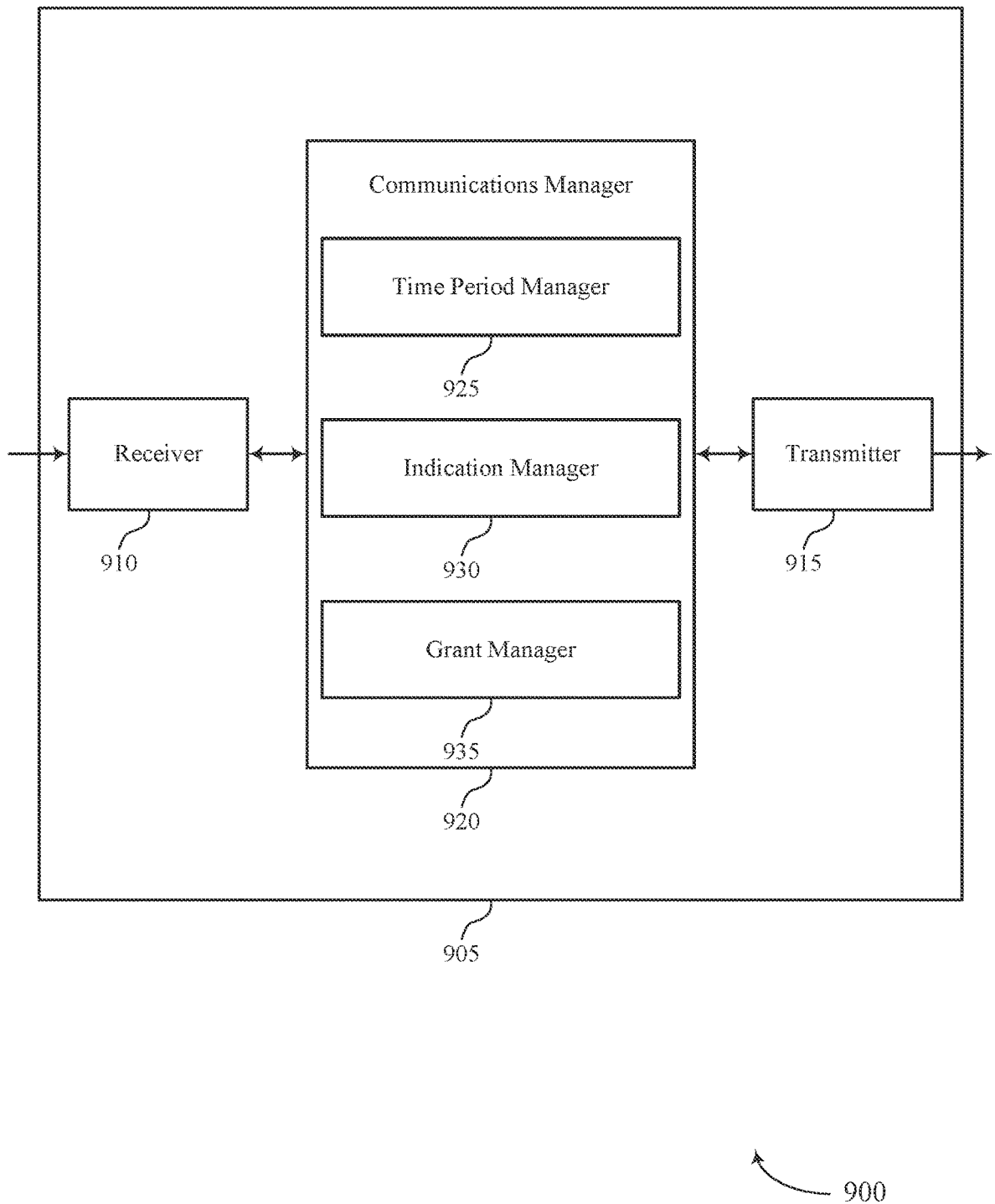

FIGS. 8 and 9 show block diagrams of devices that support DRX for CG/SPS in accordance with one or more aspects of the present disclosure.

Figure 10:
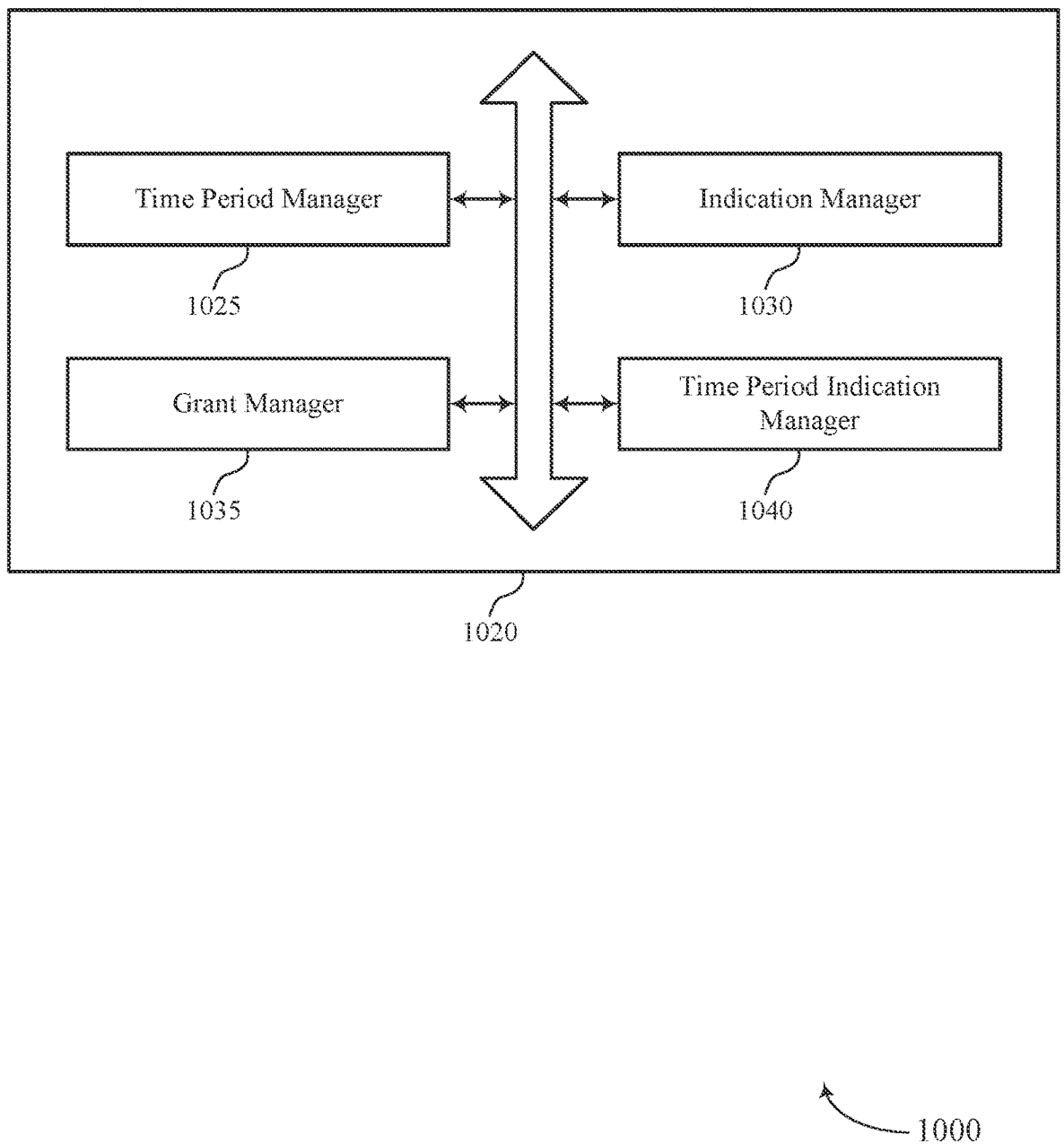

FIG. 10 shows a block diagram of a communications manager that supports DRX for CG/SPS in accordance with one or more aspects of the present disclosure.

Figure 11:
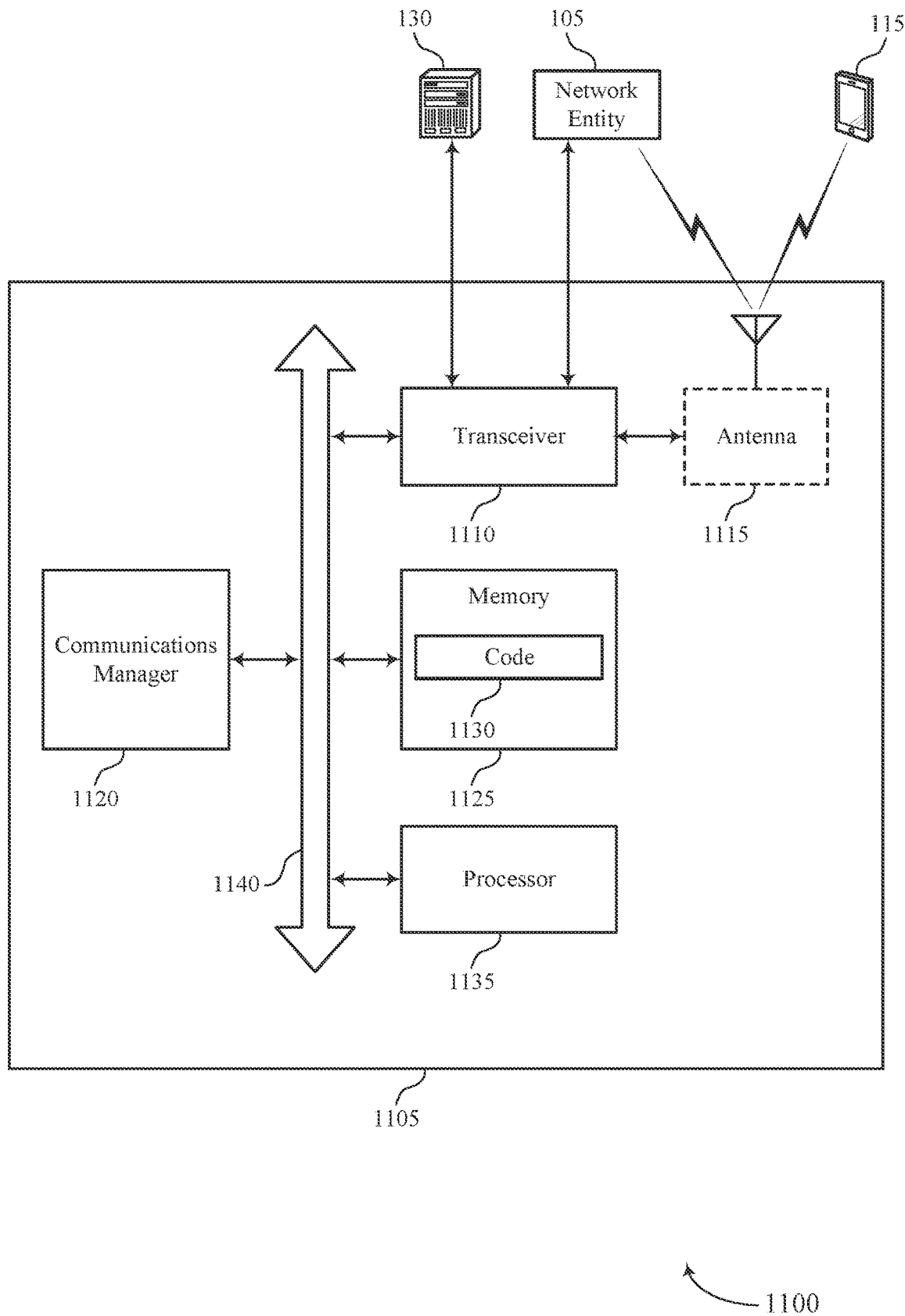

FIG. 11 shows a diagram of a system including a device that supports DRX for CG/SPS in accordance with one or more aspects of the present disclosure.

Figure 12:
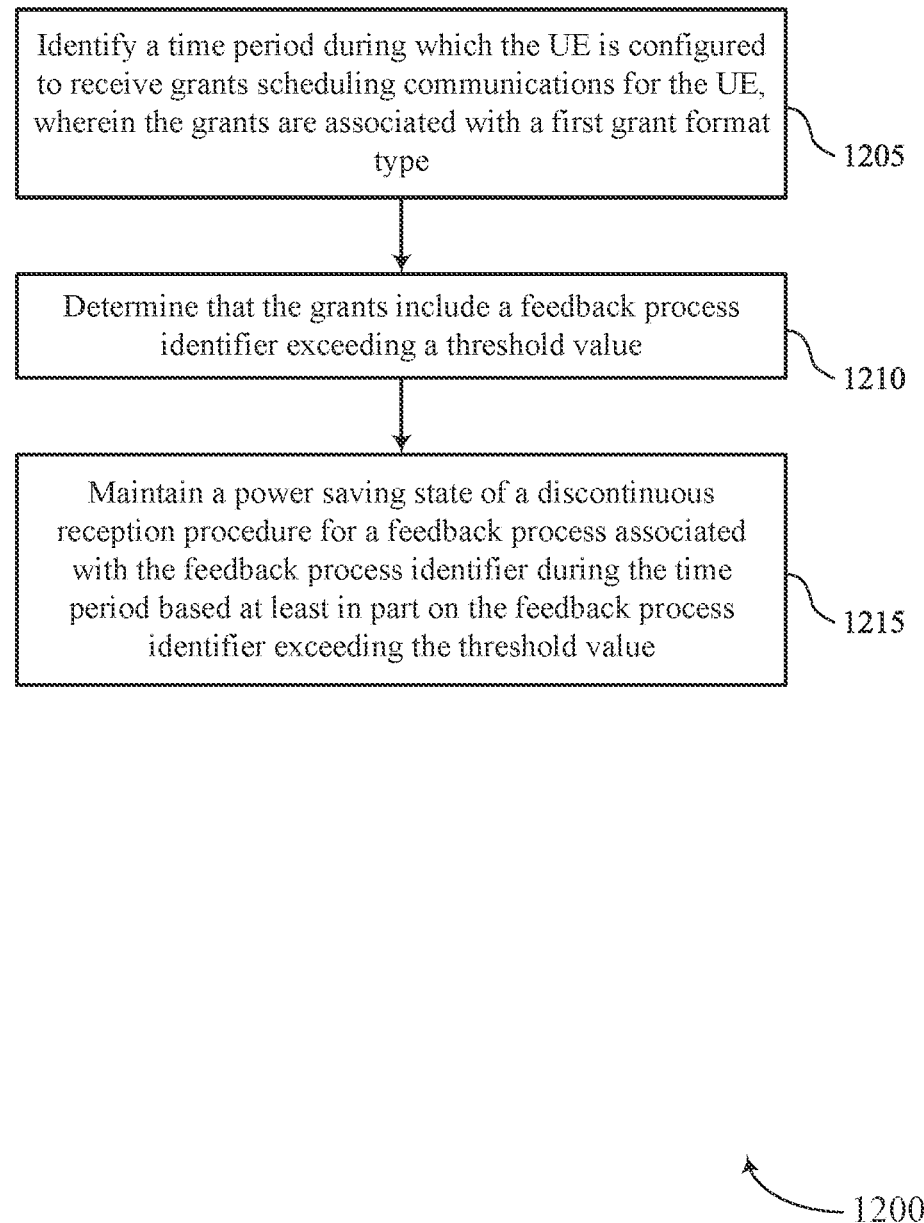
Figure 13:
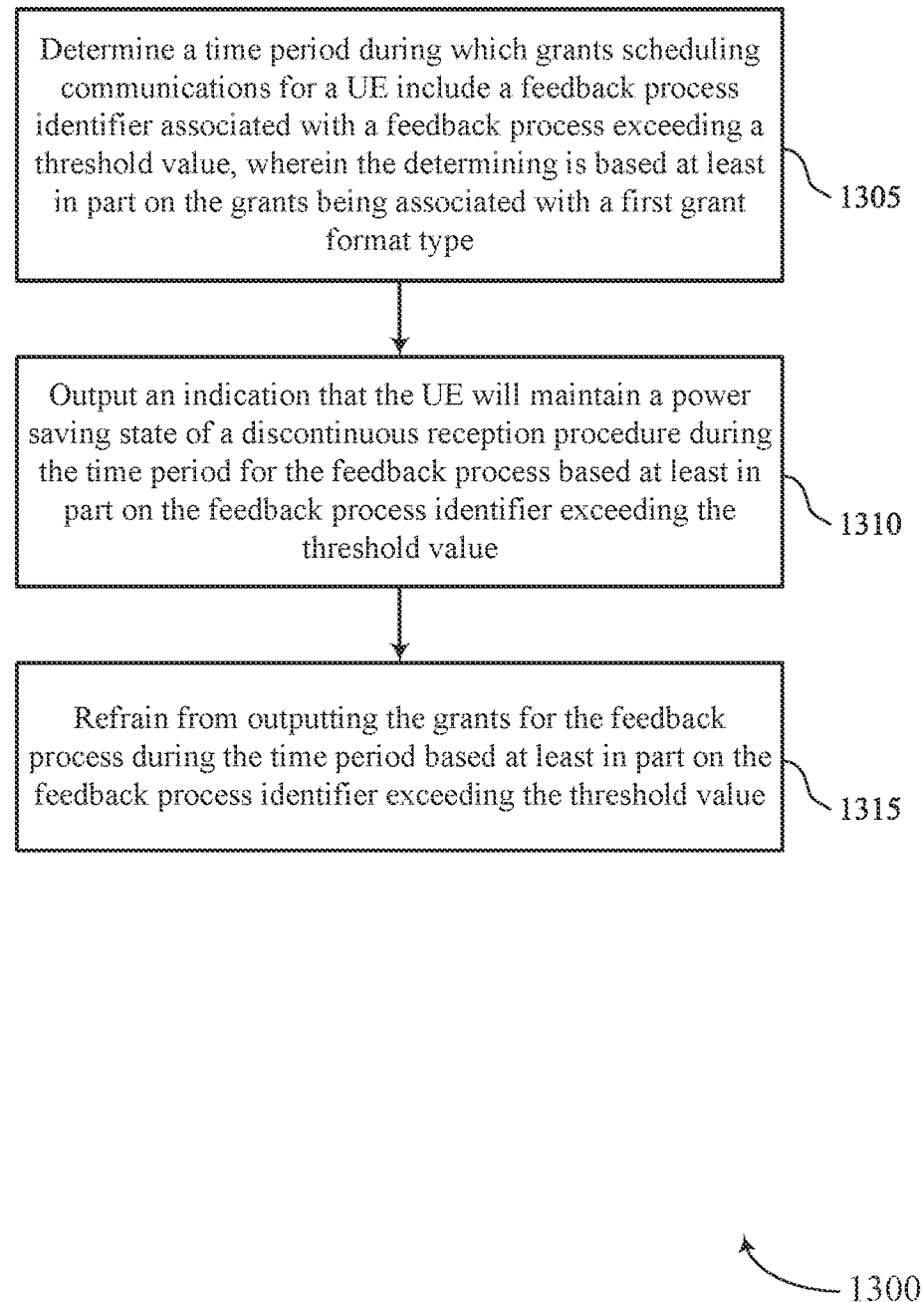

FIGS. 12 and 13 show flowcharts illustrating methods that support DRX for CG/SPS in accordance with one or more aspects of the present disclosure.

DETAILED DESCRIPTION

Wireless communication systems generally configure user equipment (UE) for wireless communications, such as uplink communications and/or downlink communications. The network (e.g., via a network entity) may periodically reconfigure various parameters of the communications, e.g., due to changing channel conditions, changes in the communication load, and the like. After sending such a reconfiguration message to the UE, the network generally uses a fallback downlink control information (DCI) format (e.g., DCI formats 0-0/1-0) to schedule communications for the UE. However, some scenarios may include a hybrid automatic repeat/request (HARQ) process identifier (ID) number/value associated with the configured communications that is not supported by the fallback DCI formats (e.g., exceeds a threshold value). As one non-limiting example, the UE may be configured with configured grant (CG) and/or semi-persistent scheduling (SPS) configurations used for the scheduled communications. Networks generally support such CG/SPS configurations including HARQ process ID numbers/values that exceed the threshold value supported by such fallback DCI formats. Accordingly, during the time period in which the UE is configured to receive such fallback DCI formats, the UE wastes resources monitoring for such DCI grants scheduling communications for the UE because those DCI formats cannot schedule communications with HARQ process ID numbers/values exceeding the threshold value.

Accordingly, the described techniques provide various mechanisms where a UE can conserve power by maintaining a power saving state during the time period when the UE is configured to receive such fallback grants. For example, the UE may identify or otherwise determine the time period during which the UE is configured to receive grant(s) having a first grant format type (e.g., DCI grants using a fallback DCI formats 0-0/1-0). The UE may use the configuration information for the communications (e.g., CG configuration and/or SPS configuration) to identify or otherwise determine that the grants include a feedback process identifier exceeding a threshold (e.g., HARQ process ID). Accordingly, the UE may maintain a power saving state (e.g., a radio resource control (RRC) idle state or an RRC inactive state) of a DRX procedure during the time period. For example, this may include the UE not monitoring for such grants, disabling timer(s) associated with the grants (e.g., retransmission timer and/or feedback timers), and the like. Accordingly, the UE may avoid monitoring for such grants during the time period when those grants include HARQ process ID number/values exceeding the threshold value.

Aspects of the disclosure are initially described in the context of wireless communications systems. Aspects of the disclosure are further illustrated by and described with reference to apparatus diagrams, system diagrams, and flowcharts that relate to discontinuous reception for CG/SPS.

Figure 1:
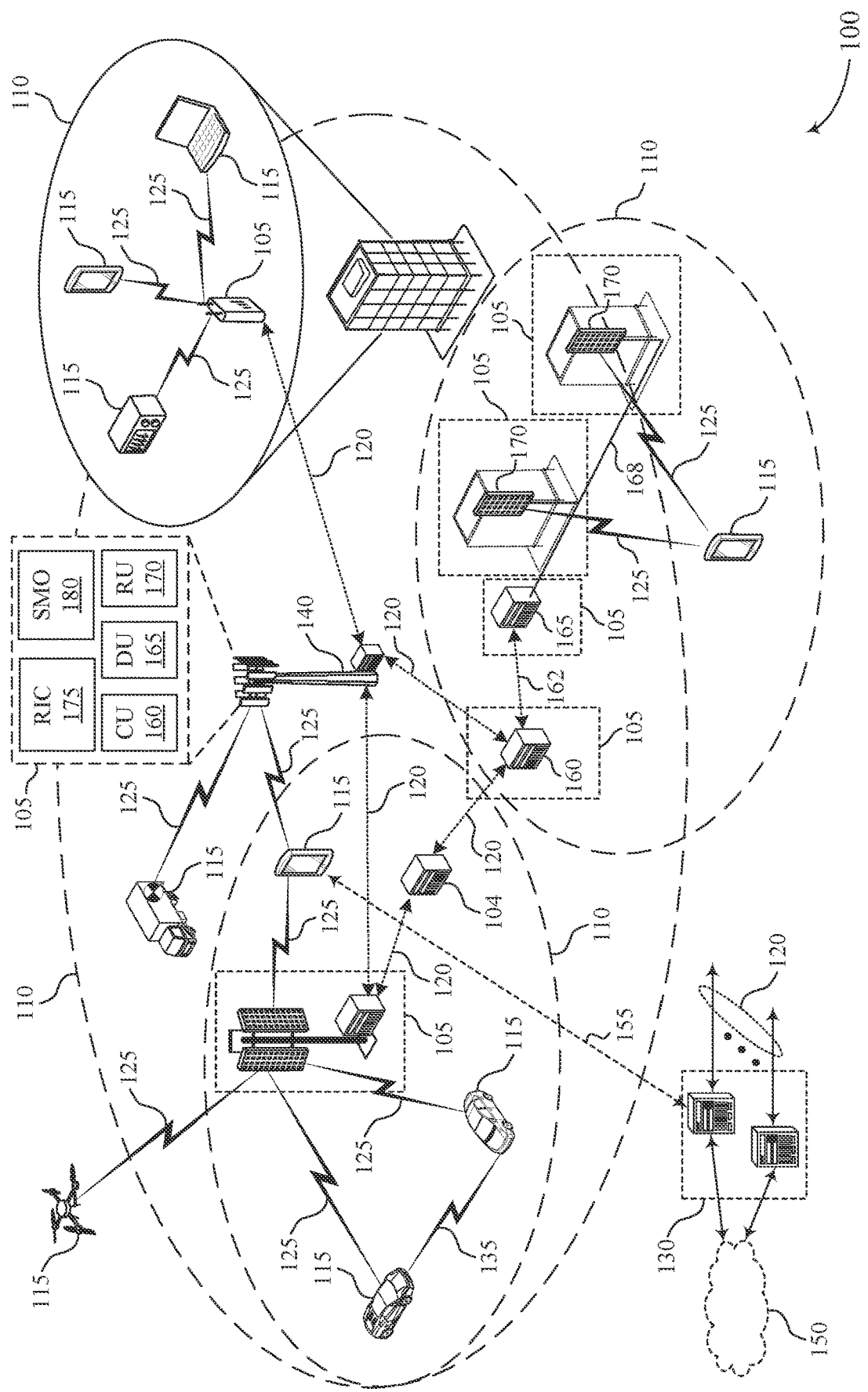
FIG. 1 illustrates an example of a wireless communications system that supports discontinuous reception (DRX)

FIG. 1 illustrates an example of a wireless communications system 100 that supports discontinuous reception for CG/SPS in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support discontinuous reception for CG/SPS as described herein. For example, some operations described as being performed by a UE 115 or a network entity 105 (e.g., a base station 140) may additionally, or alternatively, be performed by one or more components of the disaggregated RAN architecture (e.g., TAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link. 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology), The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may identify a time period during which the UE 115 is configured to receive grants scheduling communications for the UE 115, wherein the grants are associated with a first grant format type. The UE 115 may determine that the grants include a feedback process identifier exceeding a threshold value. The UE 115 may maintain a power saving state of a DRX procedure for a feedback process associated with the feedback process identifier during the time period based at least in part on the feedback process identifier exceeding the threshold value.

A network entity 105 may determine a time period during which grants scheduling communications for a UE 115 include a feedback process identifier associated with a feedback process exceeding a threshold value, wherein the determining is based at least in part on the grants being associated with a first grant format type. The network entity 105 may output an indication that the UE 115 will maintain a power saving state of a DRX procedure during the time period for the feedback process based at least in part on the feedback process identifier exceeding the threshold value. The network entity 105 may refrain from outputting the grants for the feedback process during the time period based at least in part on the feedback process identifier exceeding the threshold value.

FIG. 2 illustrates an example of a wireless communication system 200 that supports discontinuous reception for CG/SPS in accordance with one or more aspects of the present disclosure. Wireless communication system 200 may implement aspects of wireless communication system 100. Wireless communication system 200 may include UE 205 and/or network entity 210, which may be examples of the corresponding devices described herein.

UE 205 and network entity 210 may perform wireless communications, such as uplink communications from UE 205 to network entity 210 and/or downlink communications from network entity 210 to UE 205. Such communications may generally be dynamically scheduled or semi-persistent-based communications. For example, dynamically scheduled communications may include a DCI grant scheduling the communications as well as indicating resources and/or configuration information for the scheduled communications. Semi-persistent communications may include the UE being configured (e.g., using RRC signaling and/or DCI) with CG configuration(s) for uplink communications and/or with SPS configuration(s) for downlink communications. The CG/SPS configuration(s) generally (pre)configure various resources, parameters, and/or other configurations to be used for the communications. In some examples, a DCI grant may be used to identify and activate or deactivate the CG/SPS configurations for uplink/downlink communications, respectively (e.g., such as in CG type 2 scenario).

In some wireless networks, fallback DCI formats may be used by the network (e.g., via network entity 210) to schedule UE 205 for uplink/downlink transmissions, such as to avoid uncertainties between UE 205 and the network. As one non-limiting example, the network may transmit a RRC (re)configuration message to UE 205 updating or otherwise changing one or more parameters, resources, and the like, for UE 205. However, the network may not know the exact time when UE 205 has applied the new RRC configuration indicated by the RRC (re)configuration message. Moreover, during that time period a non-fallback DCI format (e.g., DCI formats 0-1, 0-2, 1-1, 1-2, etc.) transmitted to the UE may indicate a relevant configuration contained in (e.g., updated or otherwise changed by) the RRC (re)configuration message. Other situations may also be used to indicate or otherwise determine this time period of uncertainty between the network and UE 205. In this situation, the network may use fallback DCI (e.g., fallback DCI formats) to schedule UE 205 to avoid a misunderstanding regarding the current status of UE 205.

More particularly for this non-limiting example, the network may send, transmit, or otherwise provide for output to UE 205 an RRC (re)configuration message containing a new configuration for UE 205, while the RRC (re)configuration message may be successfully received by UE 205 after one or multiple ARQ/HARQ retransmissions. The RRC (re) configuration message may generally configure and/or update various communication parameters, thresholds, metrics, etc., for UE 205. Thus, before the network can ensure UE 205 applies the new configuration, e.g. via a packet data convergence protocol (PDCP)/radio link control (RLC) status report and/or an RRC uplink response message from UE 205, the network may use the fallback DCI formats to schedule UE 205. That is, the network may continue to use the fallback DCI formats to schedule communications (dynamic and/or semi-persistent) for UE 205.

In another non-limiting example including a non-terrestrial network (NTN), due to a large UE-gNB round trip time (RTT), the network may use the fallback DCI formats when scheduling UE 205 to provide for a longer scheduling time duration (e.g., when compared to a terrestrial network (TN) scheduling scenario), such as before the network can ensure UE 205 has applied the new configuration.

The fallback DCI formats (e.g., DCI formats 0_0 and/or 1_0) are generally configured to support up to 16 HARQ process (HP) IDs (e.g., HP#n, with n being limited between 0-15). This may limit scheduling UE 205 since the fallback DCI formats may not be available for use when the HARQ process IDs (e.g., feedback process identifiers, HP#) are equal to or larger than 16 (e.g., a threshold value of 15).

However, in some examples (such as NTN examples) the CG and/or SPS configuration(s) may support up to 32 HARQ processes. That is, UE 205 may be configured to support CG/SPS-based communications associated with HARQ process ID (e.g., feedback process identifier) values up to 31 (e.g., HP#n, with n being configurable between 0-31). For CG/SPS, the HARQ process ID(s) is(are) generally calculated from RRC (pre)configured parameters in the time domain (e.g., the configured periodicity, the starting time in the time domain, the configured HARQ process number, and the like). Accordingly, the HARQ process ID associated with a CG/SPS resource can be larger than or equal to 16. In some aspects, the resource allocation for a re-transmission (re-TX) of a CG/SPS-based communication may be scheduled using a DCI that is scrambled by the CS-RNTI of UE 205.

UE 205 may also operate according to a DRX procedure where UE 205 periodically powers down certain component(s)/function(s) to conserve power. For example, the DRX procedure may include UE 205 entering a power saving state (e.g., an RRC idle state or an RRC inactive state) when no communications are being performed. UE 205 may periodically wake from the power saving state to perform uplink transmissions and/or to monitor for a signal from network entity 210 indicating that there are downlink communications to be performed for UE 205. The DRX procedure may include UE 205 entering an active state (e.g., an RRC active state) to perform communications with network entity 210. For example, UE 205 may activate or otherwise enable some or all of the component(s)/function(s) to support communications between UE 205 and network entity 210.

To support such power saving operations, UE 205 may be configured with CG/SPS configuration(s) and may also apply the DRX procedure. In some aspects, this may be based on UE 205 performing downlink and/or uplink communication using downlink or uplink HP ID #n associated with the configured CG/SPS configuration(s). The UE may also be equipped/configured with or otherwise support various timers associated with such communications (such as DRX retransmission timers for downlink and/or uplink). When the timer drx-Retransmission TimerDL/drx-Retransmission TimerUL of UE 205 is/are running, UE 205 generally stays in the active state to monitor a PDCCH for a DCI scheduling the re-TX. If the network schedules a re-TX based on the decoding status of the downlink/uplink HP ID #n at the receiver (Rx), UE 205 may start the associated timer drx-Retransmission TimerDL/drx-Retransmission TimerUL upon the expiration of a RTT timer (e.g., a timer drx-HARQ-RTT-TimerDL/drx-HARQ-RTT-TimerUL). The timer drx-HARQ-RTT-TimerDL/drx-HARQ-RTT-TimerUL is generally set to a value that covers the UE-gNB or gNB-UE RTT.

According to such techniques, for each of the CG/SPS transmissions/receptions associated with a uplink and/or downlink HP ID #n with n>15, UE 205 may be configured with a drx-Retransmission Timer (e.g., drx-Retransmission TimerDL and/or drx-Retransmission TimerUL) to stay active to monitor for the DCI scheduling the reTX. In other words, when the drx-Retransmission Timer is running or otherwise active at UE 205, UE 205 may monitor a PDCCH for a DCI scheduling the reTX. However, if the network has to use the fallback DCI formats to schedule UE 205 and n>15, UE 205 can not receive a DCI scheduling the re-TX for a HARQ process with HP ID #n>15 (e.g., since the fallback DCI format can not schedule a HARQ process with a HP ID>15). That means, UE 205 would otherwise waste its power when periodically monitoring for the DCI scheduling the re-TX, which will not be transmitted until the network can return to using the non-fallback DCI formats.

Accordingly, aspects of the techniques described herein provide various mechanisms to conserve UE 205 power/resources during the time period in which the fallback DCI formats are being used. For example, UE 205 and/or network entity 210 may identify, select, or otherwise determine a time period 224 during which UE 205 is configured to receive grants scheduling communications for UE 205. For example, UE 205 may be configured with one or more CG and/or SPS configurations. Each CG and/or SPS configuration may also identify or otherwise be associated with a specific HARQ process ID (e.g., a feedback process identifier, HP#). Some or all of the CG and/or SPS configurations (e.g., as part of the DRX procedure of UE 205) may identify or otherwise be associated with a monitoring occasion during which UE 205 will transition to an active state to monitor a PDCCH to detect a DCI (e.g., grant) activating the CG and/or SPS configuration(s) being scheduled for communications.

A non-limiting example of legacy behavior begins with communication 215-*a*. For example, communication 215-*a* may include UE 205 transmitting an HARQ feedback (e.g., a NACK) in a downlink scenario or may include UE 205 performing an uplink transmission to network entity 210. Based on communication 215-*a*, UE 205 may expect that there may be a grant scheduling communications (e.g., retransmission in this example) for UE 205. Accordingly, at time t1 UE 205 may start or otherwise initiate a feedback round-trip timer (e.g., a drx-HARQ-RTT-Timer, such as drx-HARQ-RTT-TimerDL and/or drx-HARQ-RTT-TimerUL) during time period 220. The feedback round-trip timer may be associated with a specific HARP process identifier (e.g., HP#n in this non-limiting example). The value of the feedback round-trip timer may be identified, selected, or otherwise determined based on the distance between UE 205 and network entity network entity 210, based on a network configuration, and/or based on the type of RAN (e.g., NTN vs TN). At time t2, the feedback round-trip timer may expire (e.g., end or otherwise run out) and UE 205 may start or otherwise initiate a retransmission timer (e.g., a drx-Retransmission Timer) during time period 222. The retransmission timer may also be associated with the specific HARQ process identifier (e.g., HP#n in this non-limiting example). During time period 222, UE 205 may monitor a PDCCH for a DCI scheduling a communication (e.g., retransmission in this example) for the HARQ process and perform the communications according to the scheduling DCI. In this non-limiting example, the HARQ process identifier associated with grant 215 is equal to or greater than 16 (e.g., n=>16). UE 205 may continue to monitor for the grant during time period 222 (e.g., until time t3 where the retransmission timer expires or otherwise ends.

However, at time t4 UE 205 and/or network entity 210 may identify or otherwise determine the time period 224 during which UE 205 is configured to receive grants scheduling communication for UE 205. For example, at time t4 UE 205 and/or network entity 210 may identify or otherwise determine that the grants scheduling the communications for UE 205 during time period 224 will use a first grant format type (e.g., may be fallback DCI formats 0_0 and/or 1_0). Accordingly, UE 205 and/or network entity 210 may detect that the network will switch to using the fallback DCI formats during time period 224.

In some examples, identifying or otherwise determining the time period 224 may be based on the network (re)configuring UE 205. For example, network entity 210 may transmit or otherwise provide for output to UE 205 a reconfiguration message (e.g., RRC (re)configuration message(s) that changes, updated, and/or otherwise (re)configures communication parameters of UE 205. Based on the time period 224 during which UE 205 will update its settings/parameters per the reconfiguration message, the network may use the fallback DCI formats when scheduling UE 205. This may signal that the HARQ process identifiers indicated in the DCI being limited to n=0-15. Accordingly, in some examples UE 205 and/or network entity 210 may identify the time period 224 based on the reconfiguration message communicated at time t4.

In another example, identifying or otherwise determining the time period 224 may be based on a threshold number of fallback DCI formats being received. For example, UE 205 and/or network entity 210 may identify or otherwise determine that a threshold number of grants having the first grant format type have been communicated. For example, UE 205 and/or network entity 210 may identify or otherwise determine that a configured number (e.g., one or more) of fallback DCIs (e.g., consecutively and/or within a window) have been communicated. Accordingly, in some examples UE 205 and/or network entity 210 may identify the time period 224 based on the determination at time t4 that the threshold number of fallback DCI format grants have been received.

In another example, identifying or otherwise determining the time period 224 may be based on explicit signaling. For example, network entity 210 may transmit or otherwise provide for output to UE 205 an indication that UE 205 is to maintain a power saving state during time period 224. That is, the indication may be an explicit indication from the network (e.g., via network entity 210) via a DCI, medium access control-control element (MAC-CE), and/or RRC signaling. For example, the indication may be carried in the DCI scheduling the RRC (re)configuration message, in a MAC-CE scheduled by a fallback DCI format, and the like. In some examples, the indication may carry or otherwise convey an indication that UE 205 is to remain in the power saving state and/or an indication of time period 224 (e.g., the explicit indication may indicate the network's estimated time duration for using the fallback DCI formats when scheduling UE 205). In some examples, the indication may carry or otherwise convey an indication of the behavior of UE 205 (e.g., how to maintain the power saving state) during the time period 224.

Moreover, UE 205 and/or network entity 210 may identify or otherwise determine that the grants scheduling communications may include a feedback process identifier that exceeds a threshold. For example, as discussed above the HARQ process identifier in this example equals or is greater than 16 (e.g., n=>16). UE 205 and/or network entity 210 may identify or otherwise determine that the grants include HP# with n=>16 based on the CG and/or SPS configuration (s), in some examples.

Accordingly and during the time period 224, UE 205 may maintain the power saving state (e.g., RRC idle, RRC inactive, or not monitoring PDCCH) of the DRX procedure for the feedback process associated with the feedback process identifier. That is, UE 205 may maintain the power saving state during time period 224 based on the HP#n of the HARQ process associated with the scheduled communications exceeding the threshold value (e.g., n=>16). Upon detecting/receiving the indication that the network will use the fallback DCI formats, UE 205 may modify its behavior for the HARQ process number associated with the CG/SPS configuration where n>15.

Generally, this may include UE 205 refraining from monitoring for the grant(s) scheduling communications during time period 224. For example, UE 205 may not monitor the PDCCH for fallback DCI grant(s) scheduling communications where the HARQ process identifier associated with the communications is greater than 15. In the situation where the scheduled communications are CG and/or SPS based communications, this may include the fallback DCI formats scheduling retransmission(s) of the communications. In some examples, this may include UE 205 disabling or otherwise modifying one or more timers during time period 224, such as retransmission timer and/or the feedback round-trip timer associated with the HARQ process.

For example, UE 205 may disable its drx-Retransmission Timer and/or drx-HARQ-RTT-Timer for the HARQ process number (e.g., HP#n). This may include the drx-Retransmission Timer not being started by UE 205 after a CG/SPS transmission/reception. In this example, UE 205 may not be required to be awake/active to monitor for a DCI scheduling a retransmission. This may save or otherwise conserve the power consumption of UE 205.

Additionally or alternatively, in some examples instead of monitoring for the DCI scheduling the retransmission for HP#n, UE 205 may autonomously perform the retransmission using a CG/SPS resource. For example, UE 205 may use at least one of the next CG/SPS resource associated with HP#n for the retransmission. Additionally, or alternatively, UE 205 may decrease the configured value of cg-Retransmission Timer, when UE 205 has been configured with the cg-Retransmission Timer. The cg-Retransmission Timer generally configures the duration after a CG (re)transmission of a HARQ process when UE 205 shall not autonomously retransmit that HARQ process.

In some example, UE 205 may determine if and how to modify its UE behavior (e.g., how to maintain the power saving state), based on the quality-of-service (QoS) requirements of data/logical channel(s) (LCH)(s) to be multiplexed and transmitted with HP#n. For example, when there is a high reliability requirement for the data/LCH(s), UE 205 may use at least one of the next CG/SPS resources associated with HP#n for the retransmission or decrease the configured value of cg-Retransmission Timer (e.g., in addition to or instead of disabling its drx-Retransmission Timer). This may support UE 205 avoiding wasting its power and yet still support UE 205 autonomously performing the retransmission to improve reliability a satisfy a reliability requirement. Accordingly, in some examples UE 205 maintaining the power saving state during time period 224 may include UE 205 disabling or otherwise modifying one or both timers associated with the HARQ process at time t4.

Thus, during time period 224 UE 205 may be configured with communication 215-b, which may otherwise trigger a feedback round-trip timer (e.g., drx-HARQ-RTT-Timer) at time t5 that runs until time t6 (e.g., would otherwise be active during time period 226). For example, communication 215-b may include UE 205 transmitting a NACK in a downlink scenario or an uplink transmission that may trigger HARQ feedback from network entity 210. At time t6, UE 205 may start or otherwise initiate a retransmission timer (e.g., drx-Retransmission Timer) that runs until time t7 (e.g., would otherwise run during time period 228). UE 205 may optionally disable or otherwise modify the feedback round-trip timer and/or the feedback process timer during time periods 226 and 228, respectively, as part of maintaining the power saving state during time period 224.

Similarly, during time period 224 UE 205 may be configured with communication 215-c, which may otherwise trigger a feedback round-trip timer (e.g., drx-HARQ-RTT-Timer) at time t8 that runs until time t9 (e.g., would otherwise be active during time period 230). For example, communication 215-c may include UE 205 transmitting a NACK in a downlink scenario or an uplink transmission that may trigger HARQ feedback from network entity 210. At time t9, UE 205 may start or otherwise initiate a retransmission timer (e.g., drx-Retransmission Timer) that runs until time t10 (e.g., would otherwise run during time period 232). UE 205 may optionally disable or otherwise modify the feedback round-trip timer and/or the feedback process timer during time periods 230 and 232, respectively, as part of maintaining the power saving state during time period 224. Accordingly, UE 205 may conserve or otherwise reduce power consumption during time period 224 during which UE 205 would otherwise be scheduled to receive/monitor fallback DCI format grants scheduling communications for UE 205 when those communications are associated with HARQ processes having identifiers>15. In some examples, the network may (e.g., via network entity 210) refrain from transmitting or otherwise providing for output to UE 205 the grants for the HARQ process during the time period 224 (e.g., based on the HP#n being>15).

The time period 224 may end or otherwise expire at time t11, after which UE 205 may return to legacy behavior. For example, UE 205 may identify or otherwise determine a second time period (e.g., beginning at time t11 and extending forward) during which UE 205 is configured to receive additional grants (e.g., associated with communications 215-

*d*) scheduling communications for UE 205. The additional grants may be associated with a second grant format type (e.g., non-fallback DCI formats). Accordingly, UE 205 may transition or otherwise switch from the power saving state to the active state of the DRX procedure during the second time period to receive the additional grants.

In some aspects, UE 205 may identify or otherwise determine the second time period based autonomously and/or based on an explicit indication. For example, UE 205 may identify or otherwise determine that a threshold number of grants have been received that use the second grant format type. For example, the timing of receiving the non-fallback DCI format grants may indicate the second time period (e.g., the second time period may begin when the threshold number of non-fallback DCI format grants are received). Additionally, or alternatively, the network may transmit or otherwise provide an indication that UE 205 will receive the additional grants having the second grant format type.

Accordingly, UE 205 may fall back to the legacy behavior (e.g., enable the retransmission and/or feedback round-trip timer(s) for the HARQ process(es), restoring the configured value of the cg-Retransmission Timer) at and after time t11. UE 205 may fall back to the legacy behavior upon receiving a (pre)configured number (e.g., one or more) of non-fallback DCI format grants (consecutively and/or within a window). In some examples, when the network signals its estimated time duration for UE 205 to maintain the power saving state during time period 224, this may indicate when the second time period begins. In some examples, the network may (e.g., via network entity 210) transmit or otherwise provide for output to UE 205 an indication of the second time period (e.g., a second indication), such as via DCI, MAC-CE, and/or RRC signaling.

FIG. 3 illustrates an example of a method 300 that supports discontinuous reception for CG/SPS in accordance with one or more aspects of the present disclosure. Method 300 may implement aspects of wireless communication systems 100 and/or 200. Aspects of method 300 may be implemented at or by UE 305 and/or network entity 310, which may be examples of the corresponding devices described herein.

At 315, network entity 310 may identify or otherwise determine a time period. In some examples, the time period may span a period in the time domain in which grants schedule communications for UE 305. In some examples, the grants may include a feedback process identifier (e.g., an identifier for the HARQ process associated with the scheduled communications, which may also be referred to as a HARQ process identifier (ID)). In some examples, the feedback process identifier of the feedback process may exceed a threshold value (e.g., HP#n, where n>15). In some examples, the grants may use a first grant format type (e.g., fallback DCI format grants). In some examples, the feedback process identifier may be associated with CG or SPS communications, e.g., the grant(s) may schedule retransmissions of the communications.

At 320, UE 305 may identify or otherwise determine the time period. In some examples, the time period may span the period in the time domain in which grants schedule communications for UE 305. In some examples, the grants may include a feedback process identifier (e.g., an identifier for the HARQ process associated with the scheduled communications, which may also be referred to as a HARQ process identifier (ID)). In some examples, the feedback process identifier of the feedback process may exceed a threshold value (e.g., HP#n, where n>15). In some examples, the grants may use a first grant format type (e.g., fallback DCI format grants). In some examples, the feedback process identifier may be associated with CG or SPS communications, e.g., the grant(s) may schedule retransmissions of the communications.

In some examples, UE 305 may identify the time period based on receiving or otherwise obtaining a reconfiguration message. In some examples, the reconfiguration message may be a RRC reconfiguration message. In some examples, the reconfiguration message may carry or otherwise convey information updating or otherwise reconfiguring one or more communication parameters of UE 305. In some examples, the time period may be based on the reconfiguration message (e.g., a timing of the reconfiguration message). In some examples, the time period may generally correspond to the time period in which network entity 310 may use fallback DCI format grants when scheduling communications for UE 305 while UE 305 is adopting or otherwise implementing the (re)configured or otherwise updated communication parameters.

In some examples, UE 305 may identify the time period based on a threshold number of grants. In some examples, UE 305 may identify or otherwise determine that the threshold (e.g., one or more) number of grants having the first grant format type have been received (e.g., consecutively and/or within a window in the time domain). In some examples, the time period may be based on the determining. For example, the time period may begin upon the determining.

In some examples, UE 305 may identify the time period based on an explicit indication. For example, network entity 310 may transmit or otherwise provide for output to UE 305 an indication. In some examples, the indication may carry or otherwise convey information that UE 305 is to maintain a power saving state during the time period. In some examples, the indication may carry or otherwise convey information identifying the time period. In some examples, the indication may carry or otherwise convey information instructing the behavior of UE 305 during the time period (e.g., disable/modify retransmission and/or feedback round-trip timer(s) of UE 305 that are associated with the feedback process during the time period).

At 325, UE 305 may identify or otherwise determine that the grants (e.g., or at least a subset of the grants) scheduling communications for UE 305 include a feedback process identifier that exceeds a threshold value. In some examples, this may include UE 305 identifying or otherwise determining that the fallback DCI format grants are being used to schedule communications for UE 305 during the time period. In some examples, this may include UE 305 identifying or otherwise determining that the feedback process identifier included in the grants (or at least the subset of the grants) exceed the threshold value (e.g., n>15) for the fallback DCI format(s) being used. In some examples, UE 305 may identify or otherwise determine the feedback process identifiers to be included in the grants based on CG and/or SPS configuration(s) of UE 305.

At 330, UE 305 may transition to or otherwise maintain a power saving state. In some examples, the power saving state may be part of a DRX procedure of UE 305. In some examples, the power saving state may be a RRC idle state or an RRC inactive state. In some examples, the power saving state may be for a feedback process (e.g., HARQ process). In some examples, the feedback process may be associated with the feedback process identifiers exceeding the threshold value. In some examples, UE 305 may transition to or otherwise maintain the power saving state during the time period based on the feedback process identifier exceeding the threshold value.

In some examples, this may include UE 305 disabling or otherwise modifying one or more timers associated with the feedback process during the time period. In some examples, this may include UE 305 disabling a feedback round-trip timer (e.g., a drx-HARQ-RTT-Timer) during the time period. In some examples, this may include UE 305 disabling a retransmission timer (e.g., a drx-Retransmission Timer) during the time period. In some examples, this may include UE 305 disabling the feedback round-trip timer and the retransmission timer during the time period. In some examples, this may include UE 305 not (e.g., refraining from) monitoring for the grants (or at least the subset of the grants) during the timer period. In some examples, this may include network entity 310 not (e.g., refraining from) transmitting or otherwise providing for output to UE 305 the grants (or at least the subset of the grants) during the time period.

FIG. 4 shows a block diagram 400 of a device 405 that supports DRX for CG/SPS in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to DRX for CG/SPS). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to DRX for CG/SPS. In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of DRX for CG/SPS as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for identifying a time period during which the UE is configured to receive grants scheduling communications for the UE, where the grants are associated with a first grant format type. The communications manager 420 may be configured as or otherwise support a means for determining that the grants include a feedback process identifier exceeding a threshold value. The communications manager 420 may be configured as or otherwise support a means for maintaining a power saving state of a DRX procedure for a feedback process associated with the feedback process identifier during the time period based on the feedback process identifier exceeding the threshold value.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for a UE to conserve power during time period(s) when fallback DCI format grants are used to schedule communications for the UE by not monitoring for fallback DCI format grants having HARQ process IDs greater than 15.

FIG. 5 shows a block diagram 500 of a device 505 that supports DRX for CG/SPS in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to DRX for CG/SPS). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to DRX for CG/SPS). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of DRX for CG/SPS as described herein. For example, the communications manager 520 may include a time period manager 525, a grant manager 530, a power saving manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The time period manager 525 may be configured as or otherwise support a means for identifying a time period during which the UE is configured to receive grants scheduling communications for the UE, where the grants are associated with a first grant format type. The grant manager 530 may be configured as or otherwise support a means for determining that the grants include a feedback process identifier exceeding a threshold value. The power saving manager 535 may be configured as or otherwise support a means for maintaining a power saving state of a DRX procedure for a feedback process associated with the feedback process identifier during the time period based on the feedback process identifier exceeding the threshold value.

FIG. 6 shows a block diagram 600 of a communications manager 620 that supports DRX for CG/SPS in accordance with one or more aspects of the present disclosure. The communications manager 620 may be an example of aspects of a communications manager 420, a communications manager 520, or both, as described herein. The communications manager 620, or various components thereof, may be an example of means for performing various aspects of DRX for CG/SPS as described herein. For example, the communications manager 620 may include a time period manager 625, a grant manager 630, a power saving manager 635, a reconfiguration manager 640, an indication manager 645, a mode manager 650, or any combination thereof. Each of these components may communicate, directly or indirectly, with one another (e.g., via one or more buses).

The communications manager 620 may support wireless communication at a UE in accordance with examples as disclosed herein. The time period manager 625 may be configured as or otherwise support a means for identifying a time period during which the UE is configured to receive grants scheduling communications for the UE, where the grants are associated with a first grant format type. The grant manager 630 may be configured as or otherwise support a means for determining that the grants include a feedback process identifier exceeding a threshold value. The power saving manager 635 may be configured as or otherwise support a means for maintaining a power saving state of a DRX procedure for a feedback process associated with the feedback process identifier during the time period based on the feedback process identifier exceeding the threshold value.

In some examples, to support identifying the time period, the reconfiguration manager 640 may be configured as or otherwise support a means for receiving a reconfiguration message reconfiguring communication parameters of the UE, where the time period is based on a timing of the reconfiguration message.

In some examples, to support identifying the time period, the grant manager 630 may be configured as or otherwise support a means for determining that a threshold number of grants have been received having the first grant format type, where the time period is based on a timing associated with receiving the threshold number of grants having the first grant format type.

In some examples, to support identifying the time period, the indication manager 645 may be configured as or otherwise support a means for receiving an indication that the UE will maintain the power saving state during the time period, where the time period is based on the indication. In some examples, the indication is received in at least one of RRC signaling, MAC-CE signaling, DCI signaling, or any combination thereof.

In some examples, to support maintaining the power saving state, the power saving manager 635 may be configured as or otherwise support a means for refraining from monitoring for at least a subset of the grants scheduling communications during the time period. In some examples, at least the subset of the grants schedule one or more retransmissions of the communications.

In some examples, to support maintaining the power saving state, the power saving manager 635 may be configured as or otherwise support a means for disabling or modifying a retransmission timer associated with the feedback process, a feedback round-trip timer associated with the feedback process, or both, during the time period.

In some examples, the mode manager 650 may be configured as or otherwise support a means for identifying a second time period during which the UE is configured to receive additional grants scheduling communications for the UE, where the additional grants are associated with a second grant format type. In some examples, the mode manager 650 may be configured as or otherwise support a means for switching to an active state of the DRX procedure during the second time period to receive the additional grants for the feedback process.

In some examples, to support identifying the second time period, the mode manager 650 may be configured as or otherwise support a means for determining that a threshold number of grants have been received having the second grant format type, where the second time period is based on a timing associated with receiving the threshold number of grants having the second grant format type.

In some examples, to support identifying the second time period, the mode manager 650 may be configured as or otherwise support a means for receiving an indication that the UE will receive grants associated with the second grant format type, where the second time period is based on the indication.

In some examples, the power saving manager 635 may be configured as or otherwise support a means for switching to an active state of the DRX procedure after expiration of the time period. In some examples, the feedback process identifier is associated with at least one of CG-based communications or SPS communications.

FIG. 7 shows a diagram of a system 700 including a device 705 that supports DRX for CG/SPS in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting DRX for CG/SPS). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for identifying a time period during which the UE is configured to receive grants scheduling communications for the UE, where the grants are associated with a first grant format type. The communications manager 720 may be configured as or otherwise support a means for determining that the grants include a feedback process identifier exceeding a threshold value. The communications manager 720 may be configured as or otherwise support a means for maintaining a power saving state of a DRX procedure for a feedback process associated with the feedback process identifier during the time period based on the feedback process identifier exceeding the threshold value.

By including or configuring the communications manager 720 in accordance with examples as described herein, the device 705 may support techniques for a UE to conserve power during time period(s) when fallback DCI format grants are used to schedule communications for the UE by not monitoring for fallback DCI format grants having HARQ process IDs greater than 15.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of DRX for CG/SPS as described herein, or the processor 740 and the memory 730 may be otherwise configured to perform or support such operations.

FIG. 8 shows a block diagram 800 of a device 805 that supports DRX for CG/SPS in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of DRX for CG/SPS as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for determining a time period during which grants scheduling communications for a UE include a feedback process identifier associated with a feedback process exceeding a threshold value, where the determining is based on the grants being associated with a first grant format type. The communications manager 820 may be configured as or otherwise support a means for outputting an indication that the UE will maintain a power saving state of a DRX procedure during the time period for the feedback process based on the feedback process identifier exceeding the threshold value. The communications manager 820 may be configured as or otherwise support a means for refraining from outputting the grants for the feedback process during the time period based on the feedback process identifier exceeding the threshold value.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for a UE to conserve power during time period(s) when fallback DCI format grants are used to schedule communications for the UE by not monitoring for fallback DCI format grants having HARQ process IDs greater than 15.

FIG. 9 shows a block diagram 900 of a device 905 that supports DRX for CG/SPS in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of DRX for CG/SPS as described herein. For example, the communications manager 920 may include a time period manager 925, an indication manager 930, a grant manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The time period manager 925 may be configured as or otherwise support a means for determining a time period during which grants scheduling communications for a UE include a feedback process identifier associated with a feedback process exceeding a threshold value, where the determining is based on the grants being associated with a first grant format type. The indication manager 930 may be configured as or otherwise support a means for outputting an indication that the UE will maintain a power saving state of a DRX procedure during the time period for the feedback process based on the feedback process identifier exceeding the threshold value. The grant manager 935 may be configured as or otherwise support a means for refraining from outputting the grants for the feedback process during the time period based on the feedback process identifier exceeding the threshold value.

FIG. 10 shows a block diagram 1000 of a communications manager 1020 that supports DRX for CG/SPS in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of DRX for CG/SPS as described herein. For example, the communications manager 1020 may include a time period manager 1025, an indication manager 1030, a grant manager 1035, a time period indication manager 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The time period manager 1025 may be configured as or otherwise support a means for determining a time period during which grants scheduling communications for a UE include a feedback process identifier associated with a feedback process exceeding a threshold value, where the determining is based on the grants being associated with a first grant format type. The indication manager 1030 may be configured as or otherwise support a means for outputting an indication that the UE will maintain a power saving state of a DRX procedure during the time period for the feedback process based on the feedback process identifier exceeding the threshold value. The grant manager 1035 may be configured as or otherwise support a means for refraining from outputting the grants for the feedback process during the time period based on the feedback process identifier exceeding the threshold value.

In some examples, the time period indication manager 1040 may be configured as or otherwise support a means for outputting information identifying the time period for the UE. In some examples, the information identifying the time period is output in conjunction with the indication that the UE will maintain the power saving state or is output in a separate message. In some examples, the information identifying the time period is output in at least one of RRC signaling, MAC-CE signaling, DCI signaling, or any combination thereof. In some examples, the feedback process identifier is associated with at least one of CG-based communications or SPS communications. In some examples, at least a subset of the grants schedule one or more retransmissions of the communications.

FIG. 11 shows a diagram of a system 1100 including a device 1105 that supports DRX for CG/SPS in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting DRX for CG/SPS). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for determining a time period during which grants scheduling communications for a UE include a feedback process identifier associated with a feedback process exceeding a threshold value, where the determining is based on the grants being associated with a first grant format type. The communications manager 1120 may be configured as or otherwise support a means for outputting an indication that the UE will maintain a power saving state of a DRX procedure during the time period for the feedback process based on the feedback process identifier exceeding the threshold value. The communications manager 1120 may be configured as or otherwise support a means for refraining from outputting the grants for the feedback process during the time period based on the feedback process identifier exceeding the threshold value.

By including or configuring the communications manager 1120 in accordance with examples as described herein, the device 1105 may support techniques for a UE to conserve power during time period(s) when fallback DCI format grants are used to schedule communications for the UE by not monitoring for fallback DCI format grants having HARQ process IDs greater than 15.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of DRX for CG/SPS as described herein, or the processor 1135 and the memory 1125 may be otherwise configured to perform or support such operations.

FIG. 12 shows a flowchart illustrating a method 1200 that supports DRX for CG/SPS in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include identifying a time period during which the UE is configured to receive grants scheduling communications for the UB, where the grants are associated with a first grant format type. The operations of 1205 may be performed in accordance with examples as disclosed herein. In some examples, aspects of the operations of 1205 may be performed by a time period manager 625 as described with reference to FIG. 6.

At 1210, the method may include determining that the grants include a feedback process identifier exceeding a threshold value. The operations of 1210 may be performed in accordance with examples as disclosed herein. In some examples, aspects of the operations of 1210 may be performed by a grant manager 630 as described with reference to FIG. 6.

At 1215, the method may include maintaining a power saving state of a DRX procedure for a feedback process associated with the feedback process identifier during the time period based on the feedback process identifier exceeding the threshold value. The operations of 1215 may be performed in accordance with examples as disclosed herein. In some examples, aspects of the operations of 1215 may be performed by a power saving manager 635 as described with reference to FIG. 6.

FIG. 13 shows a flowchart illustrating a method 1300 that supports DRX for CG/SPS in accordance with one or more aspects of the present disclosure. The operations of the method 1300 may be implemented by a network entity or its components as described herein. For example, the operations of the method 1300 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1305, the method may include determining a time period during which grants scheduling communications for a UE include a feedback process identifier associated with a feedback process exceeding a threshold value, where the determining is based on the grants being associated with a first grant format type. The operations of 1305 may be performed in accordance with examples as disclosed herein. In some examples, aspects of the operations of 1305 may be performed by a time period manager 1025 as described with reference to FIG. 10.

At 1310, the method may include outputting an indication that the UE will maintain a power saving state of a DRX procedure during the time period for the feedback process based on the feedback process identifier exceeding the threshold value. The operations of 1310 may be performed in accordance with examples as disclosed herein. In some examples, aspects of the operations of 1310 may be performed by an indication manager 1030 as described with reference to FIG. 10.

At 1315, the method may include refraining from outputting the grants for the feedback process during the time period based on the feedback process identifier exceeding the threshold value. The operations of 1315 may be performed in accordance with examples as disclosed herein. In some examples, aspects of the operations of 1315 may be performed by a grant manager 1035 as described with reference to FIG. 10.

The following provides an overview of aspects of the present disclosure:

Aspect 1: A method for wireless communication at a UE, comprising: identifying a time period during which the UE is configured to receive grants scheduling communications for the UE, wherein the grants are associated with a first grant format type; determining that the grants include a feedback process identifier exceeding a threshold value; and maintaining a power saving state of a DRX procedure for a feedback process associated with the feedback process identifier during the time period based at least in part on the feedback process identifier exceeding the threshold value.

Aspect 2: The method of aspect 1, wherein identifying the time period comprises: receiving a reconfiguration message reconfiguring communication parameters of the UE, wherein the time period is based at least in part on a timing of the reconfiguration message.

Aspect 3: The method of any of aspects 1 through 2, wherein identifying the time period comprises: determining that a threshold number of grants have been received having the first grant format type, wherein the time period is based at least in part on a timing associated with receiving the threshold number of grants having the first grant format type.

Aspect 4: The method of any of aspects 1 through 3, wherein identifying the time period comprises: receiving an indication that the UE will maintain the power saving state during the time period, wherein the time period is based at least in part on the indication.

Aspect 5: The method of aspect 4, wherein the indication is received in at least one of RRC signaling, MAC-CE signaling, DCI signaling, or any combination thereof.

Aspect 6: The method of any of aspects 1 through 5, wherein maintaining the power saving state comprises: refraining from monitoring for at least a subset of the grants scheduling communications during the time period.

Aspect 7: The method of aspect 6, wherein at least the subset of the grants schedule one or more retransmissions of the communications.

Aspect 8: The method of any of aspects 1 through 7, wherein maintaining the power saving state comprises: disabling or modifying a retransmission timer associated with the feedback process, a feedback round-trip timer associated with the feedback process, or both, during the time period.

Aspect 9: The method of any of aspects 1 through 8, further comprising: identifying a second time period during which the UE is configured to receive additional grants scheduling communications for the UE, wherein the additional grants are associated with a second grant format type; and switching to an active state of the DRX procedure during the second time period to receive the additional grants for the feedback process.

Aspect 10: The method of aspect 9, wherein identifying the second time period comprises: determining that a threshold number of grants have been received having the second grant format type, wherein the second time period is based at least in part on a timing associated with receiving the threshold number of grants having the second grant format type.

Aspect 11: The method of any of aspects 9 through 10, wherein identifying the second time period comprises: receiving an indication that the UE will receive grants associated with the second grant format type, wherein the second time period is based at least in part on the indication.

Aspect 12: The method of any of aspects 1 through 11, further comprising: switching to an active state of the DRX procedure after expiration of the time period.

Aspect 13: The method of any of aspects 1 through 12, wherein the feedback process identifier is associated with at least one of CG-based communications or SPS communications.

Aspect 14: A method for wireless communication at a network entity, comprising: determining a time period during which grants scheduling communications for a UE include a feedback process identifier associated with a feedback process exceeding a threshold value, wherein the determining is based at least in part on the grants being associated with a first grant format type; outputting an indication that the UE will maintain a power saving state of a DRX procedure during the time period for the feedback process based at least in part on the feedback process identifier exceeding the threshold value; and refraining from outputting the grants for the feedback process during the time period based at least in part on the feedback process identifier exceeding the threshold value.

Aspect 15: The method of aspect 14, further comprising: outputting information identifying the time period for the UE.

Aspect 16: The method of aspect 15, wherein the information identifying the time period is output in conjunction with the indication that the UE will maintain the power saving state or is output in a separate message.

Aspect 17: The method of any of aspects 15 through 16, wherein the information identifying the time period is output in at least one of RRC signaling, MAC-CE signaling, DCI signaling, or any combination thereof.

Aspect 18: The method of any of aspects 14 through 17, wherein the feedback process identifier is associated with at least one of CG-based communications or SPS communications.

Aspect 19: The method of any of aspects 14 through 18, wherein at least a subset of the grants schedule one or more retransmissions of the communications.

Aspect 20: An apparatus for wireless communication at a UE, comprising a processor; memory coupled with the processor; and instructions stored in the memory and executable by the processor to cause the apparatus to perform a method of any of aspects 1 through 13.

Aspect 21: An apparatus for wireless communication at a UE, comprising at least one means for performing a method of any of aspects 1 through 13.

Aspect 22: A non-transitory computer-readable medium storing code for wireless communication at a UE, the code comprising instructions executable by a processor to perform a method of any of aspects 1 through 13.

Aspect 23: An apparatus for wireless communication at a network entity, comprising a processor; memory coupled with the processor; and instructions stored in the memory and executable by the processor to cause the apparatus to perform a method of any of aspects 14 through 19.

Aspect 24: An apparatus for wireless communication at a network entity, comprising at least one means for performing a method of any of aspects 14 through 19.

Aspect 25: A non-transitory computer-readable medium storing code for wireless communication at a network entity, the code comprising instructions executable by a processor to perform a method of any of aspects 14 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising: one or more memories storing processor-executable code; and one or more processors coupled with the one or more memories and individually or collectively operable to execute the code to cause the UE to: identify a time period during which the UE is configured to receive grants scheduling communications for the UE, wherein the grants are associated with a first grant format type; determine that the grants include a feedback process identifier that exceeds a threshold value, wherein the first grant format type is unusable to schedule communications associated with feedback process identifiers that exceed the threshold value; and maintain a power saving state of a discontinuous reception procedure for a feedback process associated with the feedback process identifier during the time period based at least in part on the feedback process identifier exceeding the threshold value.

2. The UE of claim 1, wherein, to identify the time period, the one or more processors are individually or collectively operable to execute the code to cause the UE to:
receive a reconfiguration message reconfiguring communication parameters of the UE, wherein the time period is based at least in part on a timing of the reconfiguration message.

3. The UE of claim 1, wherein, to identify the time period, the one or more processors are individually or collectively operable to execute the code to cause the UE to:
determine that a threshold number of grants have been received having the first grant format type, wherein the time period is based at least in part on a timing associated with receiving the threshold number of grants having the first grant format type.

4. The UE of claim 1, wherein, to identify the time period, the one or more processors are individually or collectively operable to execute the code to cause the UE to:
receive an indication that the UE will maintain the power saving state during the time period, wherein the time period is based at least in part on the indication.

5. The UE of claim 4, wherein the indication is received in at least one of radio resource control (RRC) signaling, medium access control-control element (MAC-CE) signaling, downlink control information (DCI) signaling, or any combination thereof.

6. The UE of claim 1, wherein, to maintain the power saving state, the one or more processors are individually or collectively operable to execute the code to cause the UE to:
refrain from monitoring for at least a subset of the grants scheduling communications during the time period.

7. The UE of claim 6, wherein at least the subset of the grants schedule one or more retransmissions of the communications.

8. The UE of claim 1, wherein, to maintain the power saving state, the one or more processors are individually or collectively operable to execute the code to cause the UE to:
disable or modify a retransmission timer associated with the feedback process, a feedback round-trip timer associated with the feedback process, or both, during the time period.

9. The UE of claim 1, wherein the one or more processors are individually or collectively further operable to execute the code to cause the UE to:
identify a second time period during which the UE is configured to receive additional grants scheduling communications for the UE, wherein the additional grants are associated with a second grant format type; and
switch to an active state of the discontinuous reception procedure during the second time period to receive the additional grants for the feedback process.

10. The UE of claim 9, wherein, to identify the second time period, the one or more processors are individually or collectively operable to execute the code to cause the UE to:
determine that a threshold number of grants have been received having the second grant format type, wherein the second time period is based at least in part on a timing associated with receiving the threshold number of grants having the second grant format type.

11. The UE of claim 9, wherein, to identify the second time period, the one or more processors are individually or collectively operable to execute the code to cause the UE to:
receive an indication that the UE will receive grants associated with the second grant format type, wherein the second time period is based at least in part on the indication.

12. The UE of claim 1, wherein the one or more processors are individually or collectively further operable to execute the code to cause the UE to:
switch to an active state of the discontinuous reception procedure after expiration of the time period.

13. The UE of claim 1, wherein:
the feedback process identifier is associated with at least one of configured grant-based communications or semi-persistent scheduling communications.

14. A network entity for wireless communication, comprising:
one or more memories storing processor-executable code; and one or more processors coupled with the one or more memories and individually or collectively operable to execute the code to cause the network entity to:
determine a time period during which grants scheduling communications for a user equipment (UE) include a feedback process identifier that is associated with a feedback process, and wherein the feedback process identifier exceeds a threshold value, wherein the determination is based at least in part on the grants being associated with a first grant format type, wherein the first grant format type is unusable to schedule communications associated with feedback process identifiers that exceed the threshold value;
output an indication that the UE will maintain a power saving state of a discontinuous reception procedure during the time period for the feedback process based at least in part on the feedback process identifier exceeding the threshold value; and refrain from outputting the grants for the feedback process during the time period based at least in part on the feedback process identifier exceeding the threshold value.

15. The network entity of claim 14, wherein the one or more processors are individually or collectively further operable to execute the code to cause the UE to:
output information identifying the time period for the UE.

16. The network entity of claim 15, wherein the information identifying the time period is output in conjunction with the indication that the UE will maintain the power saving state or is output in a separate message.

17. The network entity of claim 15, wherein the information identifying the time period is output in at least one of radio resource control (RRC) signaling, medium access control-control element (MAC-CE) signaling, downlink control information (DCI) signaling, or any combination thereof.

18. The network entity of claim 14, wherein:
the feedback process identifier is associated with at least one of configured grant-based communications or semi-persistent scheduling communications.

19. The network entity of claim 14, wherein at least a subset of the grants schedule one or more retransmissions of the communications.

20. A method for wireless communication by a user equipment (UE), comprising:
identifying a time period during which the UE is configured to receive grants scheduling communications for the UE, wherein the grants are associated with a first grant format type;
determining that the grants include a feedback process identifier that exceeds a threshold value, wherein the first grant format type is unusable to schedule communications associated with feedback process identifiers that exceed the threshold value; and
maintaining a power saving state of a discontinuous reception procedure for a feedback process associated with the feedback process identifier during the time period based at least in part on the feedback process identifier exceeding the threshold value.

* * * * *